United States Patent
Han et al.

(10) Patent No.: US 10,496,481 B2
(45) Date of Patent: Dec. 3, 2019

(54) METHODS AND SYSTEMS FOR REBUILDING DATA SUBSEQUENT TO THE FAILURE OF A STORAGE UNIT

(71) Applicant: HEWLETT PACKARD ENTERPRISE DEVELOPMENT LP, Houston, TX (US)

(72) Inventors: Chunqi Han, Pleasanton, CA (US); Anil Nanduri, Sunnyvale, CA (US); Murali Krishna Vishnumolakala, Sunnyvale, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 72 days.

(21) Appl. No.: 15/389,268

(22) Filed: Dec. 22, 2016

(65) Prior Publication Data
US 2017/0161146 A1 Jun. 8, 2017

Related U.S. Application Data

(63) Continuation of application No. 14/332,282, filed on Jul. 15, 2014, now Pat. No. 9,563,509.

(51) Int. Cl.
*G06F 11/00* (2006.01)
*G06F 11/10* (2006.01)

(52) U.S. Cl.
CPC ...... *G06F 11/1088* (2013.01); *G06F 11/1076* (2013.01); *G06F 11/1084* (2013.01); *G06F 11/1092* (2013.01); *G06F 11/1096* (2013.01)

(58) Field of Classification Search
CPC ............. G06F 11/1088; G06F 11/1076; G06F 11/1084; G06F 11/1092; G06F 11/1096
See application file for complete search history.

(56) References Cited

U.S. PATENT DOCUMENTS

| | | | |
|---|---|---|---|
| 4,092,732 A | 5/1978 | Ouchi | |
| 4,761,785 A | 8/1988 | Clark et al. | |
| 4,914,656 A | 4/1990 | Dunphy, Jr. et al. | |
| 5,208,813 A | 5/1993 | Stallmo | |
| 5,258,984 A | 11/1993 | Menon et al. | |
| 5,265,098 A | 11/1993 | Mattson et al. | |

(Continued)

OTHER PUBLICATIONS

Darden, "Data Integrity: The Dell|EMC Distinction", PowerSoluions, Storage Environment (May 2002), www.dell.com/powersolutions, pp. 106-109.

(Continued)

*Primary Examiner* — Anthony J Amoroso
(74) *Attorney, Agent, or Firm* — Hewlett Packard Enterprise Patent Department

(57) ABSTRACT

Described herein are techniques for storing data in a redundant manner on a plurality of storage units of a storage system. While all of the storage units are operating without failure, only error-correction blocks are stored on a first one of the storage units, while a combination of data blocks and error-correction blocks are stored on a second one of the storage units. Upon failure of the second storage unit, one or more data blocks and one or more error-correction blocks formerly stored on the second storage unit are reconstructed, and the one or more reconstructed data blocks and the one or more reconstructed error-correction blocks are stored on the first storage unit.

20 Claims, 22 Drawing Sheets

(56) References Cited

U.S. PATENT DOCUMENTS

| | | | |
|---|---|---|---|
| 5,305,326 A | | 4/1994 | Solomon et al. |
| 5,533,190 A | * | 7/1996 | Binford .............. G06F 11/1084 714/20 |
| 5,596,709 A | | 1/1997 | Bond et al. |
| 5,657,439 A | | 8/1997 | Jones et al. |
| 5,666,512 A | | 9/1997 | Nelson et al. |
| 7,308,599 B2 | | 12/2007 | Patterson |
| 7,543,100 B2 | | 6/2009 | Singhal et al. |
| 7,743,276 B2 | | 6/2010 | Jacobson et al. |
| 9,009,524 B2 | | 4/2015 | Tucek et al. |
| 2005/0114726 A1 | * | 5/2005 | Ouchi ................ G06F 11/1076 714/5.1 |
| 2008/0098157 A1 | * | 4/2008 | Andrewartha .......... G06F 12/08 711/103 |
| 2008/0115017 A1 | | 5/2008 | Jacobson |
| 2012/0079318 A1 | | 3/2012 | Colgrove et al. |
| 2013/0205167 A1 | * | 8/2013 | Deepak .............. G06F 11/2094 714/6.24 |
| 2013/0311822 A1 | | 11/2013 | Kotzur et al. |

OTHER PUBLICATIONS

Tian; et al., "PRO: A Popularity-based Multi-threaded Reconstruction Optimization for RAID-Structured Storage Systems", USENIX Association, In Proceedings of the 5th USENIX Conference on File and Storage Technologies (2007), pp. 277-290.

Wan; et al., "S2-RAID: A New RAID Architecture for Fast Data Recovery", Mass Storage Systems and Technologies (MSST), 2010 IEEE 26th Symposium on May 3-7, 2010, 9 pgs.

International Search Report and Written Opinion, from the International Searching Authority, dated Oct. 2, 2015, or International Patent Application No. PCT/US15/39252 (filed Jul. 6, 2015), 12 pgs.

Patterson et al., "A case for redundant arrays of inexpensive disks (RAID)", 1988, ACM SIGMOD Record, vol. 17, No. 3, pp. 109-116.

Park et al., "Providing fault tolerance in parallel secondary storage systems", 1986, Princeton University, Department of Computer Science, CS-TR-057-86, 10 pages.

International Preliminary Report on Patentability received for PCT Patent Application No. PCT/US2015/039252, dated Jan. 26, 2017, 7 pages.

Adam Leventhal, "Triple-Parity Raid and Beyond," Dec. 17, 2009, ACMQUEUE, vol. 7, issue 11, <http/delivery.acm.org/10.1145/1680000/1670144/p30-leventhal.pdf?ip=15.203.233.76&id=1670144&acc=OPEN&key=4D4702B0C3E38B35%2E4D4702B0C3E38B35%2E4D4702B0C3E38B35%2E6D218144511F3437&_acm_=1562105082_a041fbbe57e94ee657d149acee75c28>.

Berriman et al., "NETAPP RAID-DP™: Dual-Parity RAID 6 Protection Without Compromise ," Oct. 2006, NetApp Whitepaper, WP-7005-1006, <http://www.itotsnetworks.com/docs/RAID-DP/WP-7005-1006-netapp-raid-dp.pdf>.

Blaum et al. "EVENODD: An optimal scheme for tolerating double disk failures in RAID architectures," Apr. 1994, Proceedings of 21 International Symposium on Computer Architecture, pp. 245-254, <https://people.eecs.berkeley.edu/~culler/cs252-s02/papers/p245-blaum.pdf>.

Corbett et al., "Row-diagonal parity for double disk failure correction," Mar. 2004, Proceedings of the 3rd USENIX Conference on File and Storage Technologies, pp. 1-14, <http://static.usenix.org/events/fast04/tech/corbett/corbett_html/#salem:striping>.

Goel et al., "RAID Triple Parity," Dec. 2012, ACM SIGOPS Operating Systems Review, vol. 46. Issue 3, pp. 41-49 <https://atg.netapp.com/wp-content/uploads/2012/12/RTP_Goel.pdf>.

RAID Giks, "Basic RAID 5 Variations," Feb. 23, 2014, <https://web.archive.org/web/20140223073714/http://www.recoverraid5.info/raid5-variations.aspx>.

ReclaiMe.com, "RAID 6 Recovery," Jul. 1, 2014, <https://web.archive.org/web/20140701172601/http://www.freeraidrecovery.com/library/raid6-recovery.aspx>.

ReclaiMe.com, "RAIDs utilizing parity function(s)," Jul. 2, 2014, <https://web.archive.org/web/20140702084208/http://www.freeraidrecovery.com/library/raid-5-6.aspx>.

Symantec, "Left-symmetric layout: RAID-5 (striping with parity)," Feb. 1, 2011, Veritas Volume Manager RAID-5 arrays, RAID-5 logging, <https://sort.veritas.com/public/documents/sf/5.1/aix/html/vxvm_admin/ch01s04s09s03.htm>.

Wikipedia, "Standard RAID levels," Jul. 6, 2014, <https://en.wikipedia.org/w/index.php?title=Standard_RAID_levels&oldid=615782677>.

* cited by examiner

METHODS AND SYSTEMS FOR REBUILDING DATA SUBSEQUENT TO THE FAILURE OF A STORAGE UNIT

RELATED APPLICATIONS

This application is a Continuation of U.S. application Ser. No. 14/332,282, now U.S. Pat. No. 9,563,509, filed on Jul. 15, 2014, incorporated herein by reference.

FIELD OF THE INVENTION

The present invention relates to methods and systems for storing data in a redundant manner on a plurality of storage units of a storage system, and further relates to (i) techniques for operating the storage system when one of the storage units has failed (i.e., in a degraded mode of operation) and (ii) techniques for rebuilding the contents of the failed storage unit.

BACKGROUND

A primary advantage of a storage system with a storage array (i.e., a plurality of storage units) is its ability to recover data even when one (or more) of the storage units of the storage array has failed (and its associated data has been lost). Data recovery, in general, is enabled by storing data in a redundant manner. In the simplest form of data redundancy, data is mirrored (e.g., data is stored twice, so that if one copy of the data is lost, the other copy of the data remains and can be used to recover the lost data). Another form of data redundancy involves computing parity, in which a string of binary data is XOR'ed to form a parity bit. If one of the data bits of the binary string is lost, the parity bit can be used to recover the lost data bit.

There are certain tradeoffs between data mirroring and parity. Data mirroring is typically less efficient in terms of the use of storage space than a redundancy scheme employing parity. On the other hand, data mirroring typically provides more data redundancy (and hence a higher degree of data protection) than parity. One approach that attempts to strike a balance between the two approaches is multi-parity. For example, in a dual-parity scheme, two parity bits may be used to provide redundancy for a string of bits, allowing up to two bits of the data string to be recovered. A multi-parity approach is more efficient in terms of the use of storage space than data mirroring, while at the same time is more robust to data loss than a single parity approach. Multi-parity data redundancy schemes will be further discussed below.

A challenge that arises in data redundancy schemes for storage arrays is how to properly distribute data blocks and error-correction blocks (e.g., parity blocks) among the storage units of a storage array. If a data block and its associated error-correction block are both stored on the same storage unit, that data block is lost if the storage unit fails. Accordingly, it is essential that a data block and its associated error-correction block be stored on separate storage units to preclude the above-described scenario in which the failure of a single storage unit could result in the permanent loss of data.

A simple scheme that satisfies such constraint is the use of a dedicated parity storage unit (or more generally, a dedicated error-correction storage unit). For instance, four storage units can be used to store data, while a fifth storage unit is dedicated for parity. RAID 3 (RAID being an acronym for a redundant array of independent disks) is an example of a data redundancy scheme that employs a dedicated parity storage unit.

One common approach to manage how data is distributed onto a collection of storage units is data striping (or striping for brevity). In data striping, data is divided into a plurality of data blocks, and typically contiguous data blocks are grouped into a data stripe (or stripe for brevity). Data blocks of each stripe are distributed among the storage array. For instance in a stripe with four data blocks, the first data block could be stored on a first storage unit, the second data block could be stored on a second storage unit, and so on. Each stripe typically has one or more error-correction blocks to provide data redundancy. In the example above of storing a stripe with four data blocks, four storage units could be employed to store the four data blocks, while a fifth storage unit could be employed to store an error-correction block associated with the four data blocks.

While a dedicated parity storage unit is a simple approach to physically segregate any data block from its associated error-correction block, such approach has drawbacks. During any write to the storage array, the error-correction block associated with the modified data block will also need to be updated. As a result, the dedicated parity storage unit must be accessed during every data write, creating a heavy load (and possibly reduced response time) for the dedicated parity storage unit. One improvement to a dedicated parity storage unit is the use of rotated parity, in which parity blocks are distributed (or "rotated") among the storage units of the storage array. To be more precise, in a rotated parity scheme, the parity block(s) of one stripe are stored on a first storage unit, while the parity block(s) of another stripe are stored on a second storage unit. In such a scheme, write activity due to parity updates is distributed more evenly among the storage units of the storage array, eliminating the bottleneck associated with a dedicated parity storage unit.

RAID 6 is an example of a data redundancy scheme that employs rotated parity. For clarity of description, one RAID 6 implementation (specifically the "left symmetric" variant) is depicted in FIG. 1. Eight disks (or more generally, eight storage units) are depicted in FIG. 1. Disk 0 through disk 6 store data blocks and error correcting blocks, while disk 7 is designated as a spare. In its role as a spare, disk 7 is typically not activated unless one of disk 0 through disk 6 has failed.

For clarity of description, reference labels are used to refer to particular data blocks. For instance, d.00 is a reference label used to refer to a data block stored on disk 0. For clarity of notation, reference labels associated with data blocks begin with the letter "d", while reference labels associated with error-correction blocks begin with any one of the letters "P", "Q" or "R". For clarity of presentation, error-correction blocks are illustrated with a striped pattern. The information stored by a data block is typically in the form of a binary string (e.g., "0010101001 . . . "). Similarly, information stored by an error-correction block is typically in the form of a binary string (e.g., "10101010100 . . . "). It is noted that the spare disk (i.e., disk 7) does not actually store "SP". "SP" is merely used as a label to designate disk 7 as a spare disk in FIG. 1.

The data blocks and error-correction blocks from each row of FIG. 1 belong to a single stripe. As can be seen from FIG. 1, each stripe contains two error-correction blocks, and hence, RAID 6, in addition to employing rotated parity, also employs multi-parity, specifically dual-parity. While error-correction blocks are distributed (or rotated) among the disks, the above-noted property of storing a data block separately from its associated error-correction block(s) is still preserved (i.e., a disk never stores a data block and an error-correction block from the same stripe).

In RAID 6, a spare disk (i.e., disk 7 in the example of FIG. 1) is idle during normal operation of the storage array (i.e., when all disks are operational), and is activated only upon failure of any one of the disks. Content of the failed disk may be reconstructed onto the spare disk, and upon the completion of the data reconstruction, the spare disk may substitute in place of the failed disk. While a disk is failed (i.e., is non-operational) and before the content of the failed disk is fully reconstructed onto the spare, the storage array operates in a degraded mode of operation. In the degraded mode, the storage array can still process read and write requests, but its response time to such requests is typically slower than in a normal operation in which all disks are operational. A benefit of having a spare is the reduction in the amount of time that the storage array is operated in a degraded mode of operation (i.e., a spare can be immediately activated and reconstruction can start, as compared to the alternative without a spare, in which a spare needs to be shipped from a warehouse, connected to the storage array and then activated, before reconstruction can start). A spare, however, comes with the tradeoff of adding cost to a storage system.

FIG. 2 depicts a RAID 7 implementation (specifically, a left symmetric variant). The RAID 7 implementation is presented as a comparison to the RAID 6 implementation of FIG. 1. For a fair comparison, the number of disks between the two implementations is the same (i.e., 8 disks), and the data capacity is also unchanged (i.e., the two RAID schemes are capable of storing the same number of data blocks). An advantage of the RAID 7 implementation over the RAID 6 implementation is its added redundancy (i.e., triple-redundancy instead of dual-redundancy). On the other hand, the RAID 7 implementation has the drawback of not having a spare disk, as compared to the RAID 6 implementation with the same number of storage units. As explained above, in the event of a disk failure, the RAID 7 implementation would be forced to operate in a degraded mode of operation for an extended period of time until a replacement disk arrives (e.g., a day could be quite typical of such a time period).

SUMMARY OF THE INVENTION

In accordance with one embodiment, a data redundancy scheme provides the benefits of both the above-described RAID 6 and RAID 7 implementations. One embodiment is depicted in FIG. 4. For a fair comparison with the above-described RAID 6 and RAID 7 implementations, the embodiment of FIG. 4 also employs 8 disks and has the same data capacity (i.e., is capable of storing the same number of data blocks as the above-described RAID 6 and RAID 7 implementations). Of course, the use of exactly 8 disks is exemplary in nature, and a person having ordinary skill in the art could adapt the data redundancy technique illustrated in FIG. 4 for a different number of disks.

The embodiment of FIG. 4 provides triple-parity (thus providing the benefits of the RAID 7 implementation of FIG. 2), while at the same time, includes a disk that can serve as a spare disk (thus providing the benefits of the RAID 6 implementation). To be more specific, disk 7 is dedicated for storing error-correction blocks during normal operation of the storage array, but transforms into a spare disk upon failure of any one of the other disks. In other words, upon failure of one of the disks (i.e., any one of disk 0 through disk 6), the reconstructed contents of the failed disk over write the error-correction blocks of disk 7. One might initially be skeptical of such a scheme, in that writing over the error-correction blocks would appear to cause the loss of redundancy information. This is, however, not so. Upon the failure of any one of the disks, the triple-parity of the storage array is immediately reduced to dual-parity (i.e., instead of being able to recover three data blocks of a stripe, only two data blocks of a stripe can now be recovered). Writing over the error-correction blocks of disk 7 with the reconstructed contents of the failed disk does not result in the loss of any information since the storage array maintains its dual-parity level of redundancy during the reconstruction of the failed disk (i.e., maintains its ability to recover two data blocks of a stripe).

One notable characteristic of the embodiment of FIG. 4 is the use of both rotated and dedicated parity. According to one embodiment, two error-correction blocks from each stripe may be stored on seven of the disks in a rotated (or distributed) manner, while the eighth disk may be dedicated for storing error-correction blocks.

In accordance with one embodiment, while all of the storage units of a storage system are operating without failure, only error-correction blocks are stored on a first one of the storage units, while a combination of data blocks and error-correction blocks are stored on a second one of the storage units. Upon failure of the second storage unit, one or more data blocks and one or more error-correction blocks formerly stored on the second storage unit are reconstructed, and the one or more reconstructed data blocks and the one or more reconstructed error-correction blocks are stored on the first storage unit.

In accordance with one embodiment, a first and second data stripe is stored in a storage system. Subsequent to a failure of one of the storage units of the storage system, a data block of the second data stripe is reconstructed, and an error-correction block of the first data stripe is replaced with the reconstructed data block of the second data stripe.

In accordance with one embodiment, a first and second data stripe is stored in a storage system. Subsequent to a failure of one of the storage units of the storage system, an error-correction block of the second data stripe is reconstructed, and an error-correction block of the first data stripe is replaced with the reconstructed error-correction block of the second data stripe.

In accordance with one embodiment, during a first time duration, a first collection of the storage units is configured to store a first group of the data blocks and a first group of the error-correction blocks, the first group of the error-correction blocks being distributed among the first collection of storage units. Also during the first time duration, a second collection of the storage units is configured to store a second group of the error-correction blocks and is configured to not store any of the data blocks, the first collection of the storage units being separate from the second collection of the storage units and the first group of error-correction blocks being separate from the second group of the error-correction blocks.

In accordance with one embodiment, a data stripe is stored in the storage system, the data stripe comprising a plurality of data blocks and a plurality of error-correction blocks. Subsequent to a failure of one of the storage units of the storage system, a first one of the error-correction blocks is reconstructed, and a second one of the error-correction blocks is replaced with the reconstructed first error-correction block.

In accordance with one embodiment, a data stripe is stored in the storage system, the data stripe comprising a plurality of data blocks and one or more error-correction blocks. Subsequent to a failure of one of the storage units of the storage system, a first one of the data blocks is reconstructed, a first one of the error-correction blocks is backed up, and one copy of the first error-correction block is replaced with the reconstructed first data block.

In accordance with one embodiment, a data stripe is stored in the storage system, the data stripe comprising a plurality of data blocks and a plurality of error-correction blocks. Subsequent to a failure of one of the storage units of the storage system, a first one of the error-correction blocks is reconstructed, a second one of the error-correction blocks is backed up, and one copy of the second error-correction block is replaced with the reconstructed first error-correction block.

These and other embodiments of the invention are more fully described in association with the drawings below.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. Description associated with any one of the figures may be applied to a different figure containing like or similar components/steps. While the flow diagrams each present a series of steps in a certain order, the order of the steps may be changed.

Figure 1:
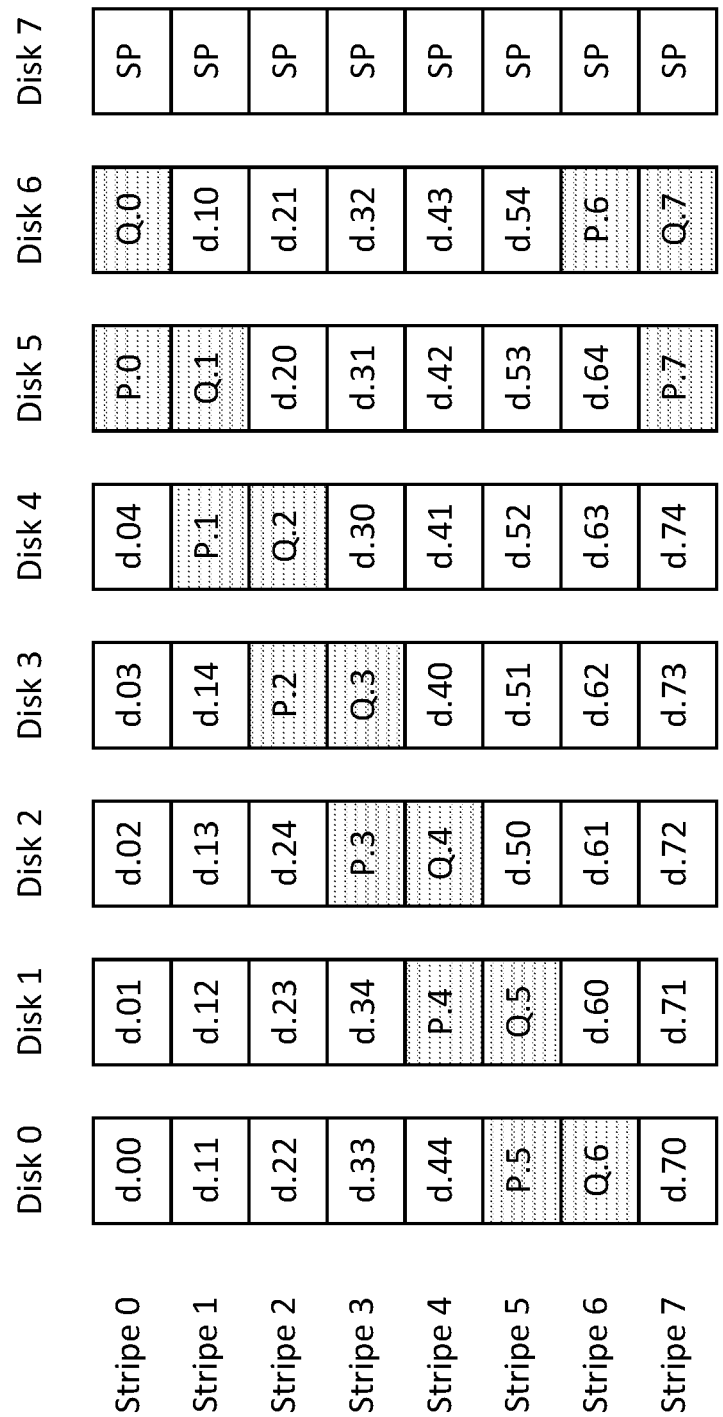
FIG. 1 depicts an arrangement of data blocks and error-correction blocks in a storage array, in accordance with a RAID 6, left symmetric implementation.
Figure 2:
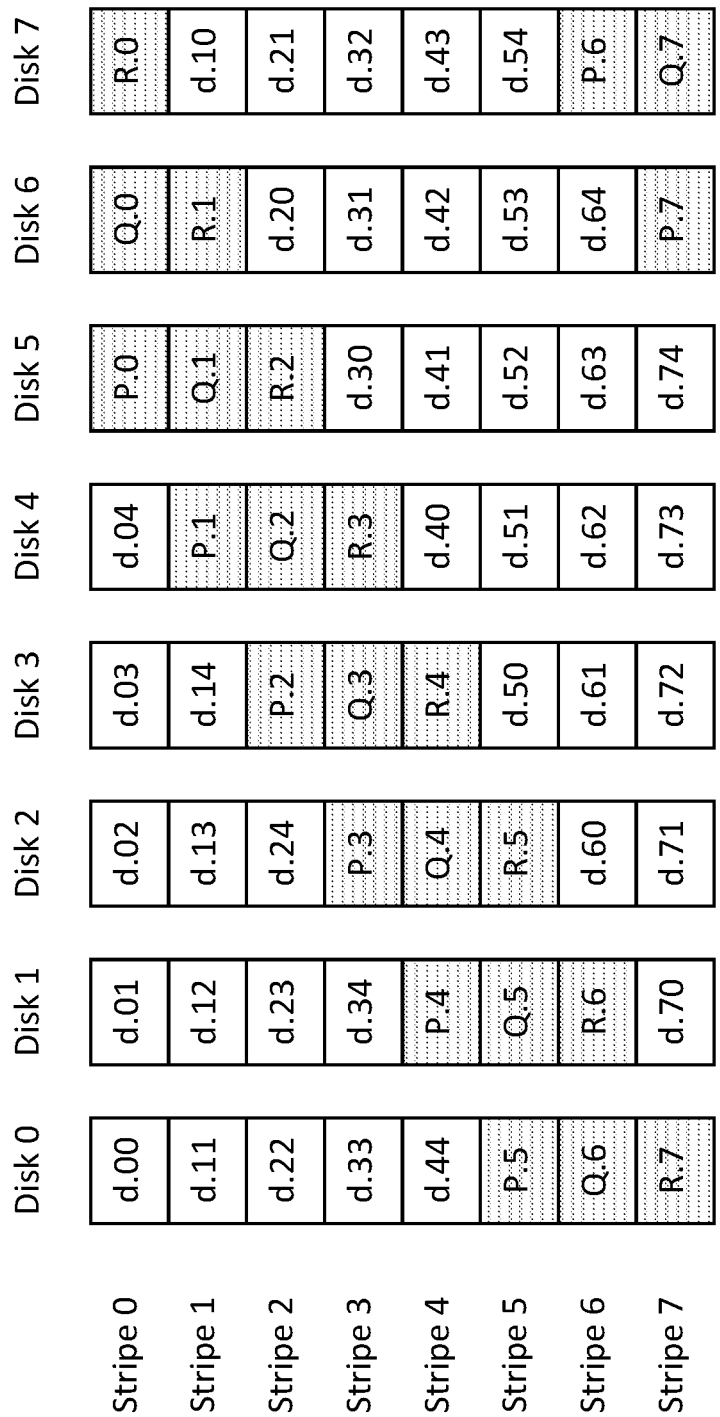
FIG. 2 depicts an arrangement of data blocks and error-correction blocks in a storage array, in accordance with a RAID 7, left symmetric implementation.
Figure 3:
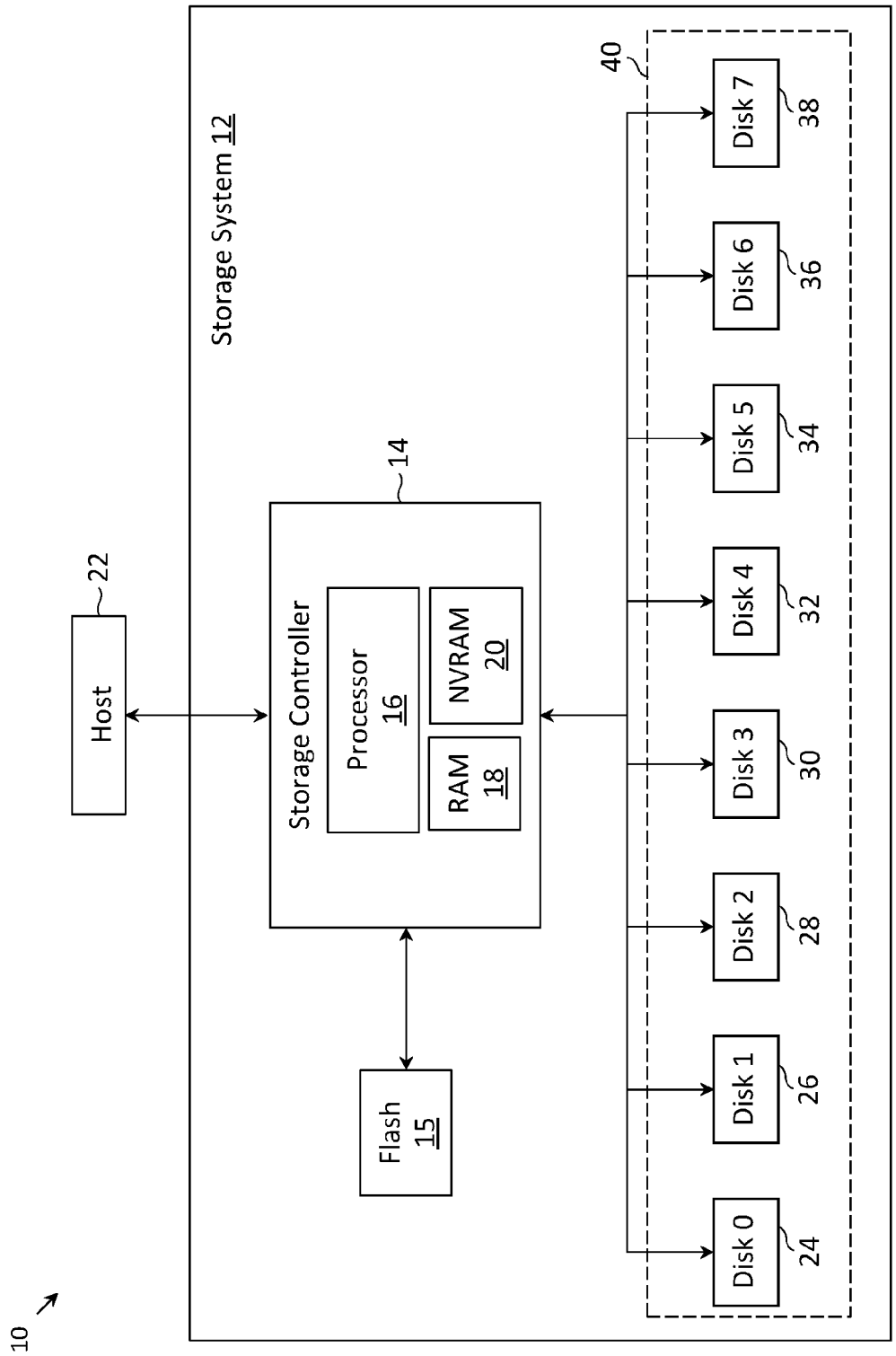
FIG. 3 depicts a storage system communicatively coupled to a host, in accordance with one embodiment.

FIG. 3 depicts system 10 in which storage system 12 may be communicatively coupled to host 22. Host 22 may transmit read and/or write requests to storage system 12, which in turn may process the read and/or write requests. While not depicted, storage system 12 may be communicatively coupled to host 22 via a network. The network may include a LAN, WAN, MAN, wired or wireless network, private or public network, etc.

Storage controller 14 of storage system 12 may receive the read and/or write requests and may process the read and/or write requests by, among other things, communicating with one or more of a plurality of storage units (24, 26, 28, 30, 32, 34, 36 and 38). The plurality of storage units may be collectively referred to as storage array 40. While each of the storage units is depicted as a disk drive in FIG. 3, the techniques of the present invention are not limited to storage devices employing magnetic disk based storage. More generally, techniques of the present invention may be applied to a plurality of storage units including one or more solid-state drives (e.g., flash drives), magnetic disk drives (e.g., hard disk drives), optical drives, etc. While eight disk drives have been depicted in storage array 40, this is not necessarily so, and a different number of disk drives may be employed in storage array 40.

Storage controller 14 may include processor 16, random access memory (RAM) 18 and non-volatile random access memory (NVRAM) 20. Processor 16 may direct the handling of read and/or write requests, and may oversee the reconstruction of the contents of a failed storage unit. More specifically, processor 16 may perform any of the processes described below in association with FIGS. 14-16. RAM 18 may store instructions that, when executed by processor 16, cause processor 16 to perform one or more of the processes of FIGS. 14-16. RAM 18 may also act as a buffer, storing yet to be processed read/write requests, storing data that has been retrieved from the storage array but not yet provided to host 22, etc. NVRAM 20 may store data that must be maintained, despite a loss of power to storage system 12. The use of NVRAM 20 is described further in FIGS. 6-13 below.

Storage controller 14 may also be communicatively coupled to flash memory 15. Flash memory 15 may be used as a read cache, pre-fetching data that host 22 is likely to request from storage array 40 in the near future. Flash memory 15 may also be used as a write buffer, coalescing a plurality of data blocks that need to be written into a data stripe, before the data stripe is written to storage array 40.

Figure 4:
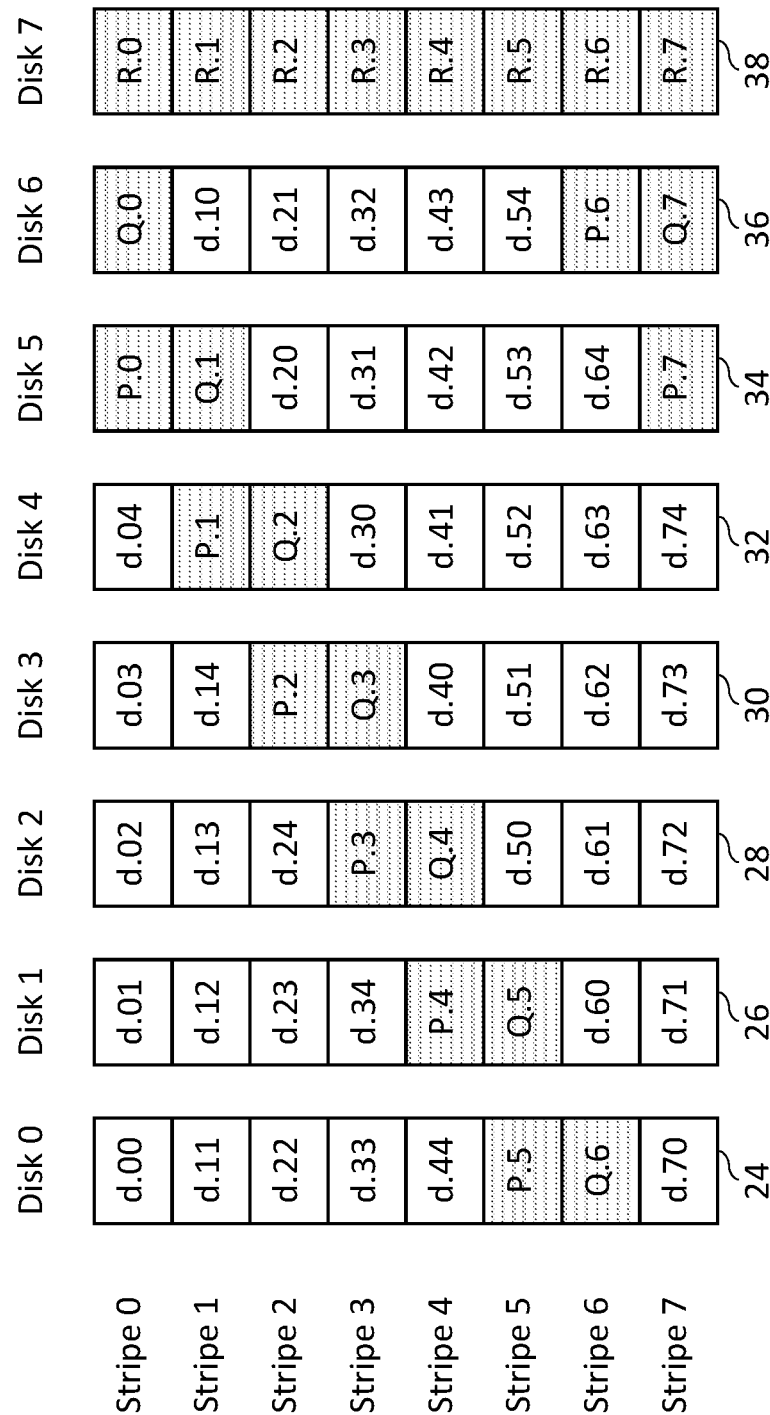
FIG. 4 depicts an arrangement of data blocks and error-correction blocks in a storage array, in accordance with one embodiment.

FIG. 4 depicts an arrangement of data blocks and error-correction blocks on storage array 40 of FIG. 3. The term "error-correction block(s)" will be used to generally refer to any block(s) of information that is dependent on one or more data blocks and can be used to recover one or more data blocks. An example of an error-correction block is a parity block, which is typically computed using XOR operations. An XOR operation is only one operation that may be used to compute an error-correction block. More generally, an error-correction block may be computed based on a code, such as a Reed-Solomon code. The term "data block(s)" will be used to generally refer to any block(s) of information that might be transmitted to or from host 22. Further, it is noted that the term "block" is used to generally refer to any collection of information typically represented as one or more binary strings (e.g., "01010100").

Each row of the arrangement may belong to one data stripe. It is, however, noted that the assignment of each row to a single data stripe may not always be maintained. For example, as described below in FIGS. 8-13, after reconstructing the data of a failed disk, the data of two stripes may be stored in a single row.

The redundancy scheme of the embodiment depicted in FIG. 4 employs triple-parity, as each stripe contains three error-correction blocks. The redundancy scheme further employs both rotated parity and dedicated parity. In the arrangement, error-correction blocks with reference labels that begin with the letter "P" and "Q" are arranged in a rotated manner, while error-correction blocks with reference labels that begin with the letter "R" are located on a disk dedicated for storing error-correction blocks (i.e., disk 7 is dedicated for storing error-correction blocks during normal operation of the storage array).

Figure 5:
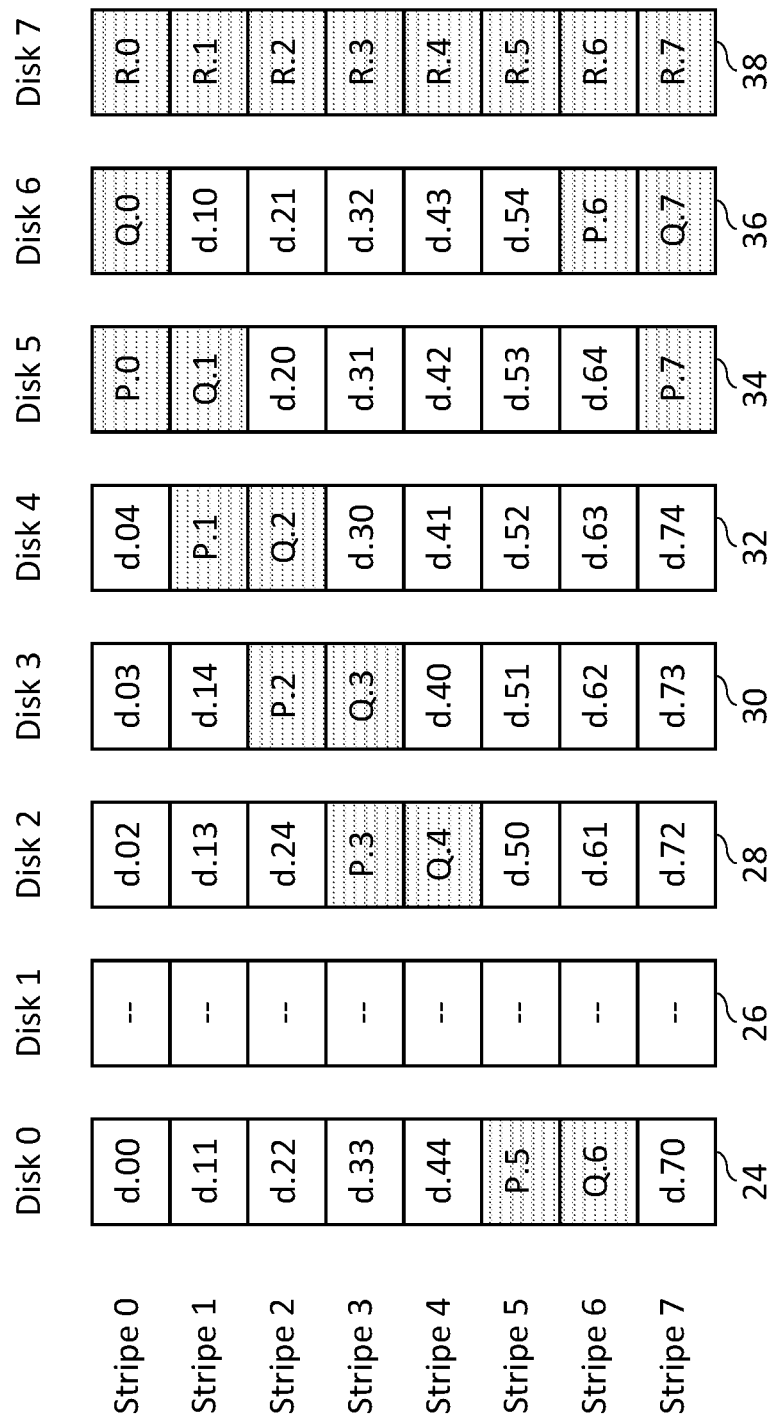
FIG. 5 depicts a storage array in which one of the storage units has failed, in accordance with one embodiment.

In FIGS. 5-13, the process of reconstructing the contents of a failed disk onto disk 7 is described in more detail. FIG. 5 depicts the scenario in which disk 1 has failed. All the contents of the disk 1 are no longer accessible, and hence the contents of disk 1 are represented as "--".

Figure 6:
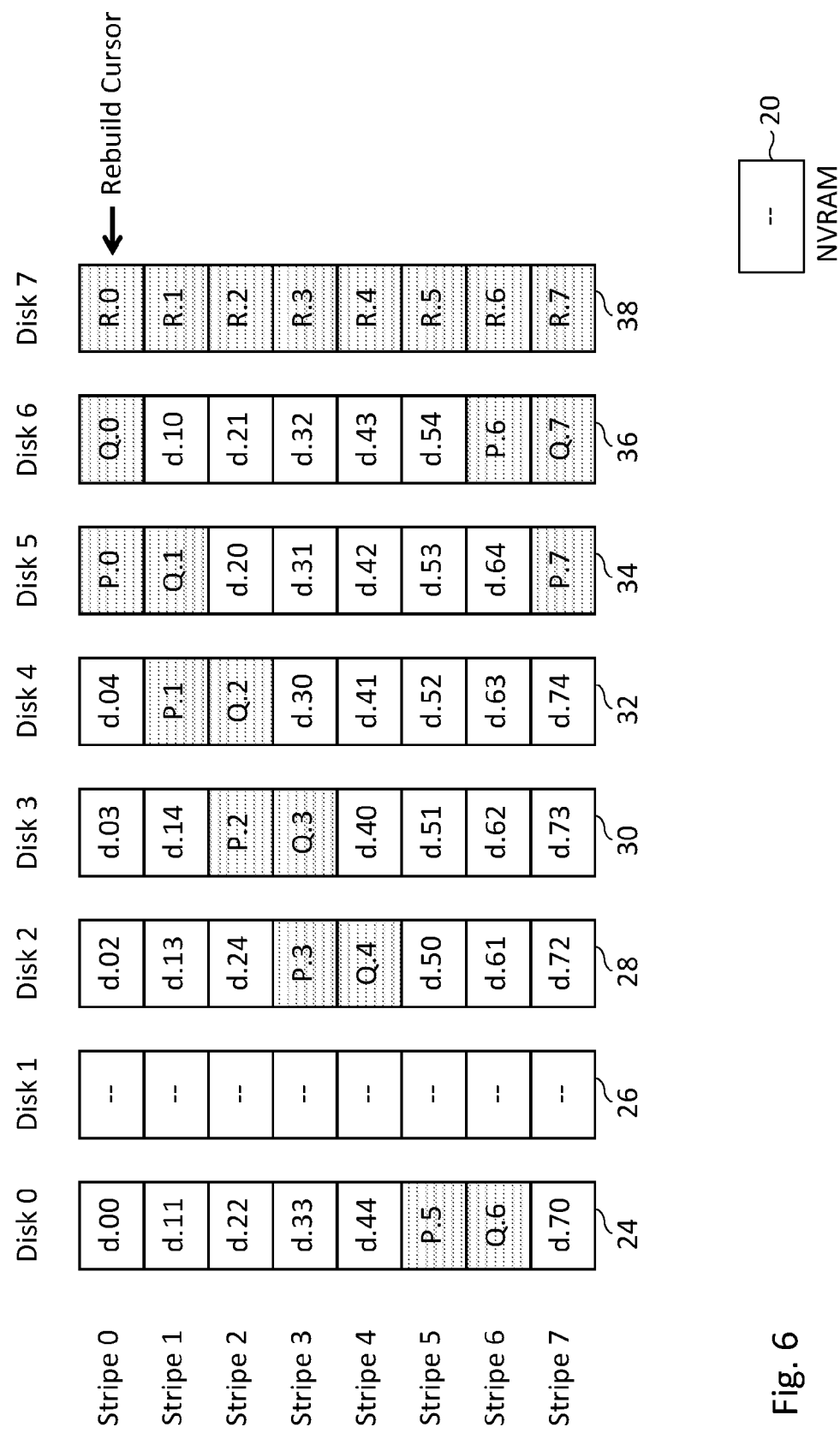
FIGS. 6-12 depict the evolving state of a storage array during the reconstruction of the contents of a failed storage unit onto a storage unit formerly dedicated for storing error-correction blocks, in accordance with one embodiment.

In one embodiment of reconstructing the contents of a failed disk, stripes are processed in an order of increasing stripe number (while other embodiments could employ a decreasing stripe number order). In other words, stripe 0 is processed, then stripe 1 is processed, and so on. A cursor (e.g., a stripe number stored in memory, such as NVRAM 20) may be used to indicate a stripe that is currently being processed. Such cursor is depicted as a "Rebuild Cursor" in FIGS. 6-13. It is noted that the terms "reconstruct" and "rebuild" are used interchangeably. As stripe 0 is processed first, the rebuild cursor initially points to stripe 0, as depicted in FIG. 6.

One approach for successively reconstructing the contents of disk 1 onto disk 7 is to reconstruct data block d.01, save d.01 at the location storing error-correction block R.0; reconstruct data block d.12, save d.12 at the location storing error-correction block R.1; reconstruct data block d.23, save d.23 at the location storing error-correction block R.2; reconstruct data block d.34, save d.34 at the location storing error-correction block R.3; reconstruct error-correction block P.4, save P.4 at the location storing error-correction block R.4; and so on. While this approach could be employed, a potential loss of data could result from such an approach. If an error were to occur during the write of d.01 over R.0 (e.g., as a result of power loss or a reboot of storage system 12), both d.01 and R.0 could be lost, resulting in the permanent loss of data block d.01.

One improvement upon such a scheme is to first backup the error-correction block of disk 7 before replacing the error-correction block of disk 7 with the reconstructed block (e.g., reconstructed data block or reconstructed error-correction block) of the failed disk. For instance, R.0 could be first written to NVRAM 20 (or other persistent storage device), before R.0 is replaced with d.01. That way, if an error occurs during the write of d.01, R.0 could be recovered from NVRAM 20; d.01 could be recovered from R.0 (and other data/error-correction blocks of stripe 0); and the write of d.01 could be attempted a second time. Saving each reconstructed block, however, would incur two writes (i.e., one write for backing up the error-correction block of disk 7 and a second write for saving the reconstructed block onto disk 7).

A further improvement is an offset-rebuild scheme, which will be discussed in detail below. To briefly summarize the scheme, R.0 can be first backed up onto NVRAM 20. Then, instead of reconstructing d.01 as in the scheme described above, one reconstructs d.12 and saves d.12 at the location of R.0 (observe how the data blocks of stripe 1 are now stored in two rows, and hence the "offset" nature of the rebuild scheme). Now, since d.12 has been reconstructed, R.1 is no longer needed (at least for the purposes of reconstructing d.12). In a similar manner, d.23 is then reconstructed, and d.23 is saved at the location of R.1 (i.e., R.1 is written over by d.23). The offset-rebuild scheme incurs only one additional write (i.e., the initial write of R.0 to NVRAM), and is robust against data loss during a write error.

Figure 7:
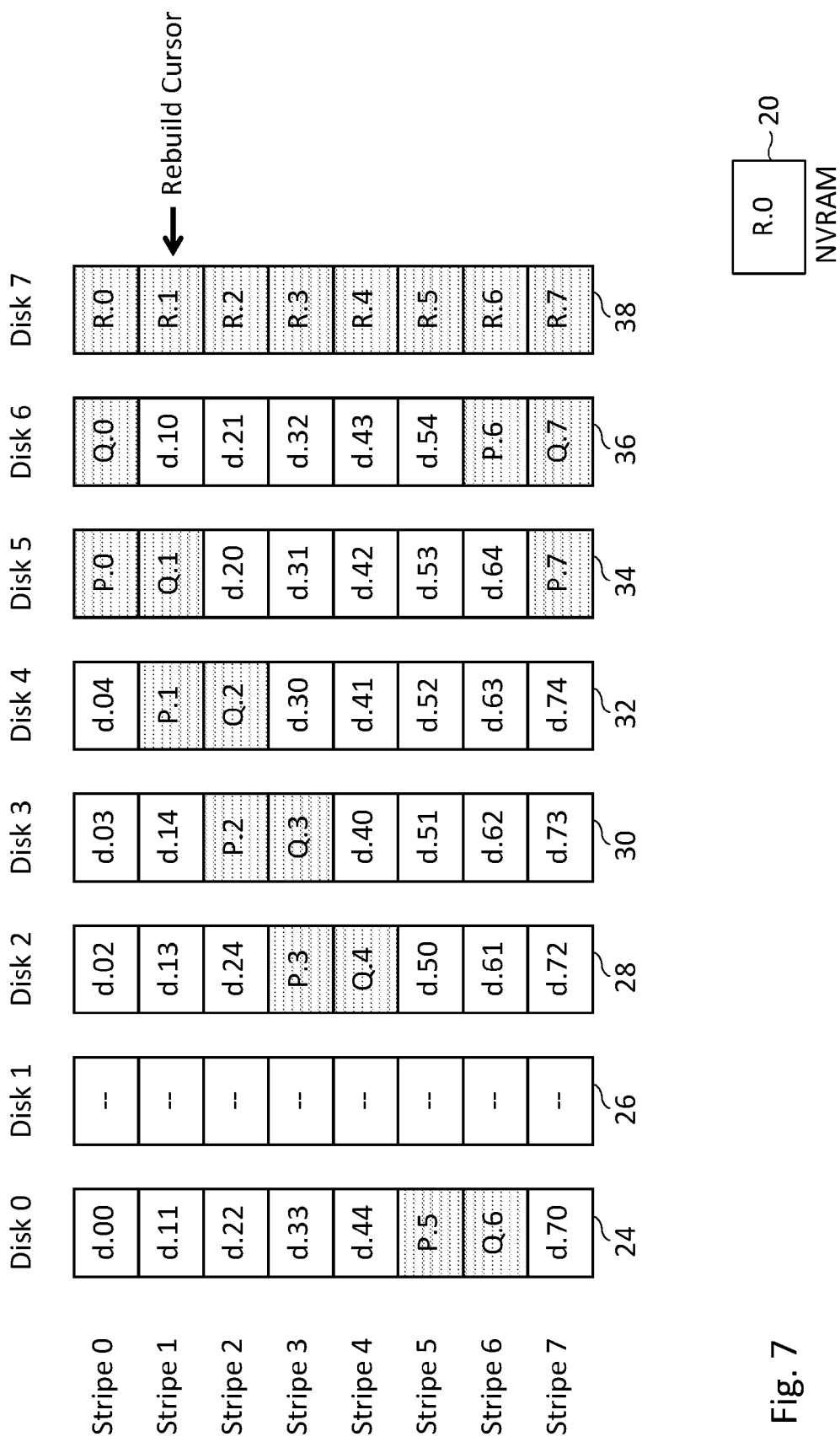

The offset-rebuild scheme is explained in further detail below in association with FIGS. 7-12. The initial processing of stripe 0 only involves saving its error-correction block from disk 7 (i.e., R.0) onto NVRAM 20, and the state of the storage array following such processing of stripe 0 is depicted in FIG. 7. As shown in FIG. 7, R.0 has been backed-up on NVRAM 20, and the rebuild cursor has advanced to stripe 1, since the initial processing of stripe 0 has concluded. Further processing of stripe 0 may be performed at a later time, as described below. In addition or in the alternative to backing-up R.0 on NVRAM, R.0 could be backed-up on any storage device that can withstand one or more disk failures in storage array 40. More particularly, R.0 can be backed-up in a redundant manner on storage array 40 itself (e.g., R.0 can be duplicated on a reserved area on each of the disks of storage array 40 that are still operational).

Figure 8:
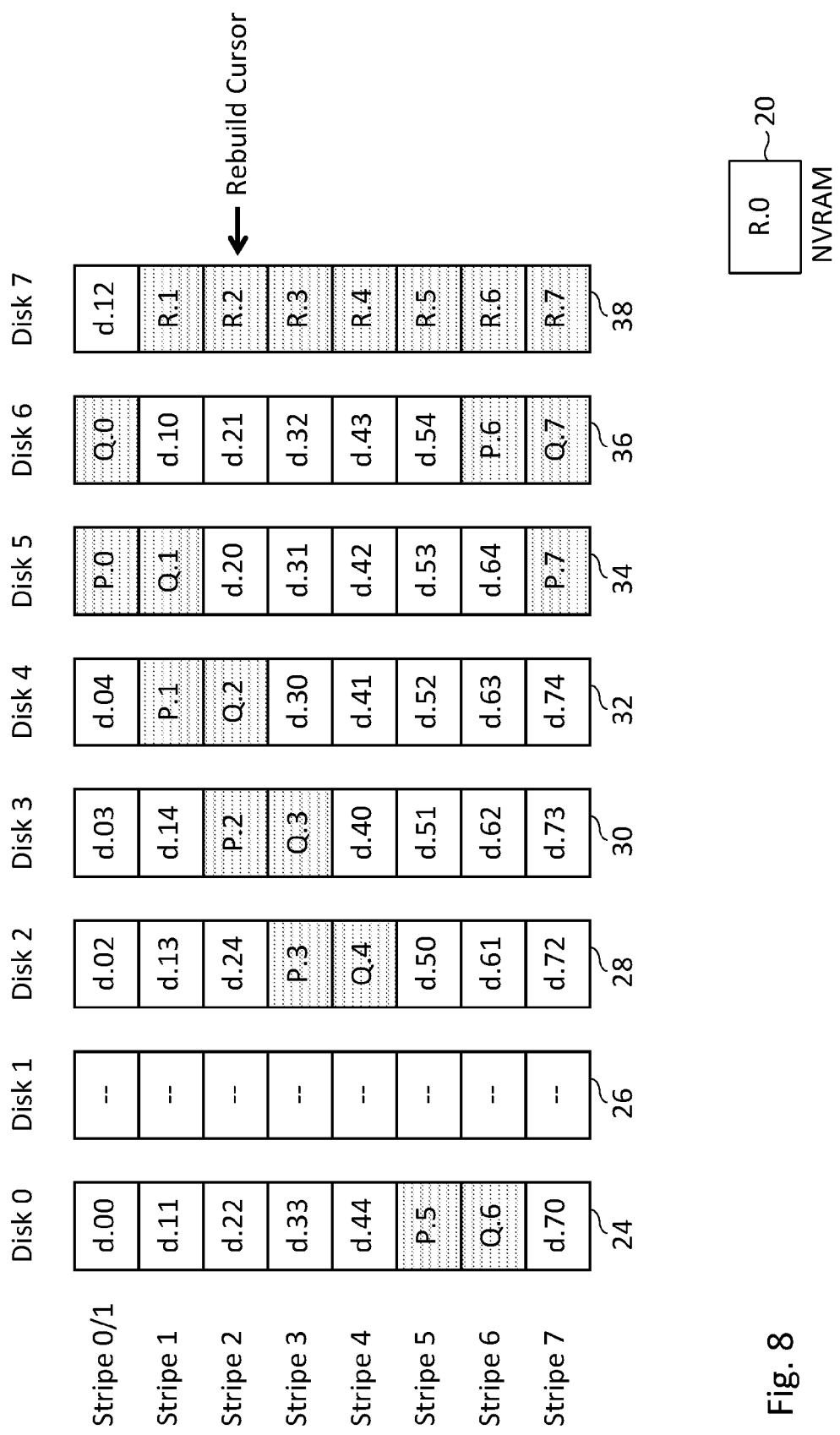

In the processing of stripe 1, the data block of stripe 1 formerly stored on disk 1 (i.e., d.12) is reconstructed, and the reconstructed data block is saved on disk 7, at the location of R.0. FIG. 8 depicts the state of the storage array after such processing. R.0 on disk 7 has been replaced with the reconstructed version of d.12, and the rebuild cursor has advanced to the next stripe (i.e., stripe 2). Because the first row now contains blocks from both stripes 0 and 1, the first row is labeled as stripe 0/1, a shorthand way to indicate stripes 0 and 1.

Figure 9:
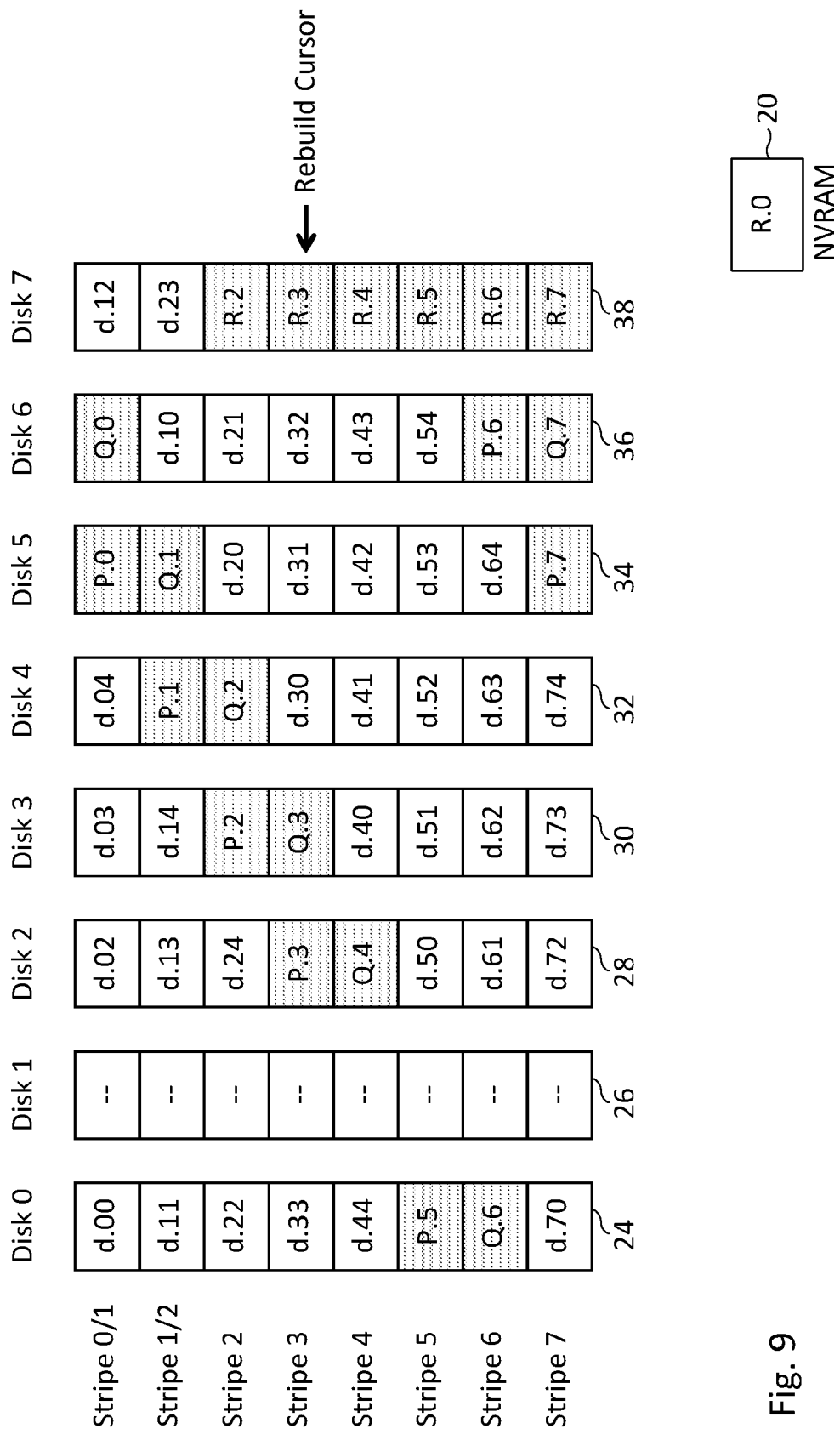

FIG. 9 depicts the state of the storage array after the processing of stripe 2. R.1 on disk 7 has been replaced with the reconstructed version of d.23, and the rebuild cursor has advanced to the next stripe (i.e., stripe 3). The processing of stripe 3 proceeds in a similar manner, and for conciseness, no figure has been included to illustrate the state of the storage array after such processing.

Figure 10:
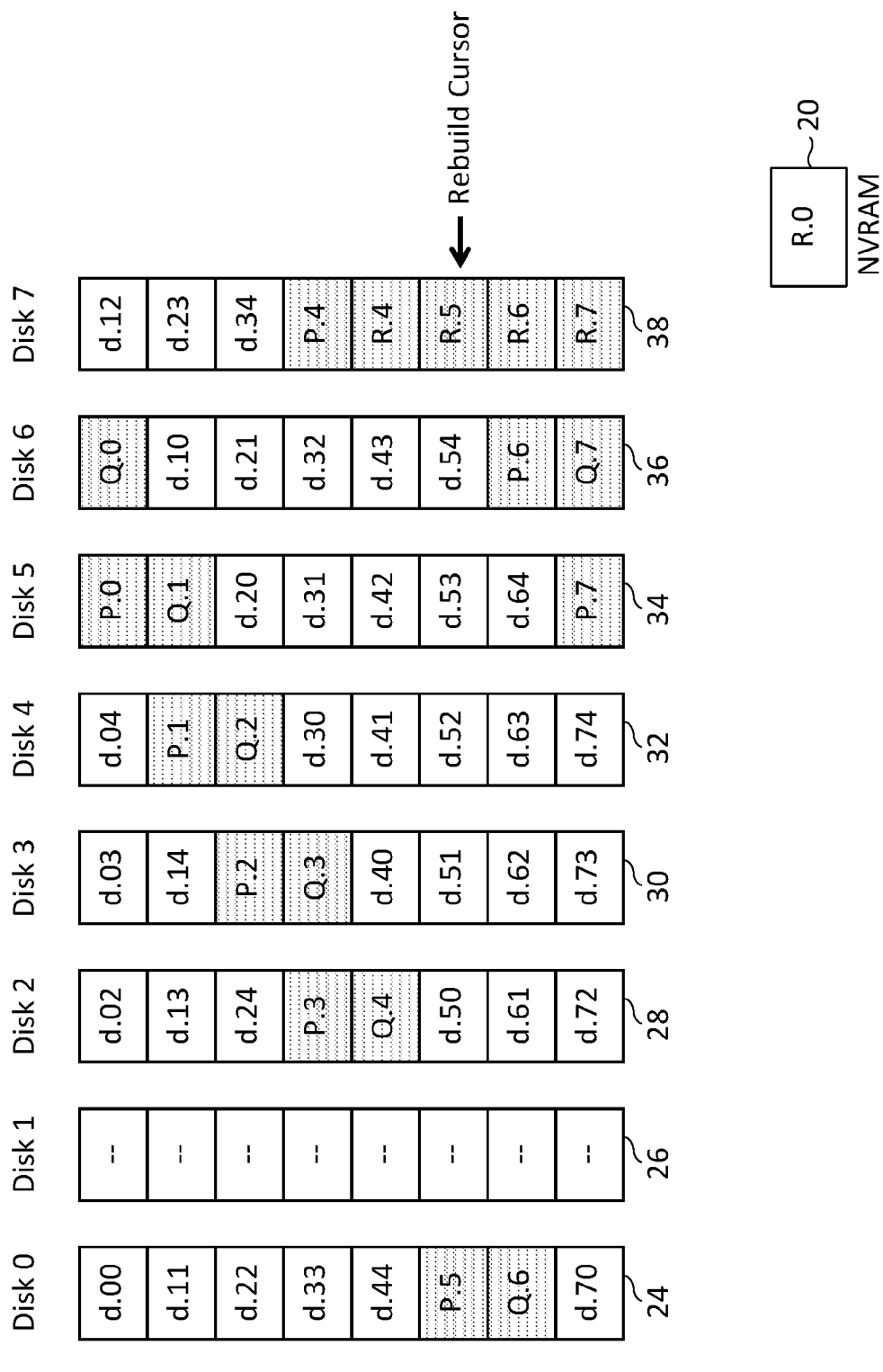

FIG. 10 depicts the state of the storage array after the processing of stripe 4. R.3 on disk 7 has been replaced with the reconstructed version of P.4, and the rebuild cursor has advanced to the next stripe (i.e., stripe 5). It is noted that in this processing, an error-correction block on disk 7 (i.e., R.3) has been replaced with a reconstructed error-correction block (i.e., P.4). The processing of stripes 5 and 6 proceed in a similar manner, and for conciseness, no figures have been included to illustrate the states of the storage array after such processing.

Figure 11:
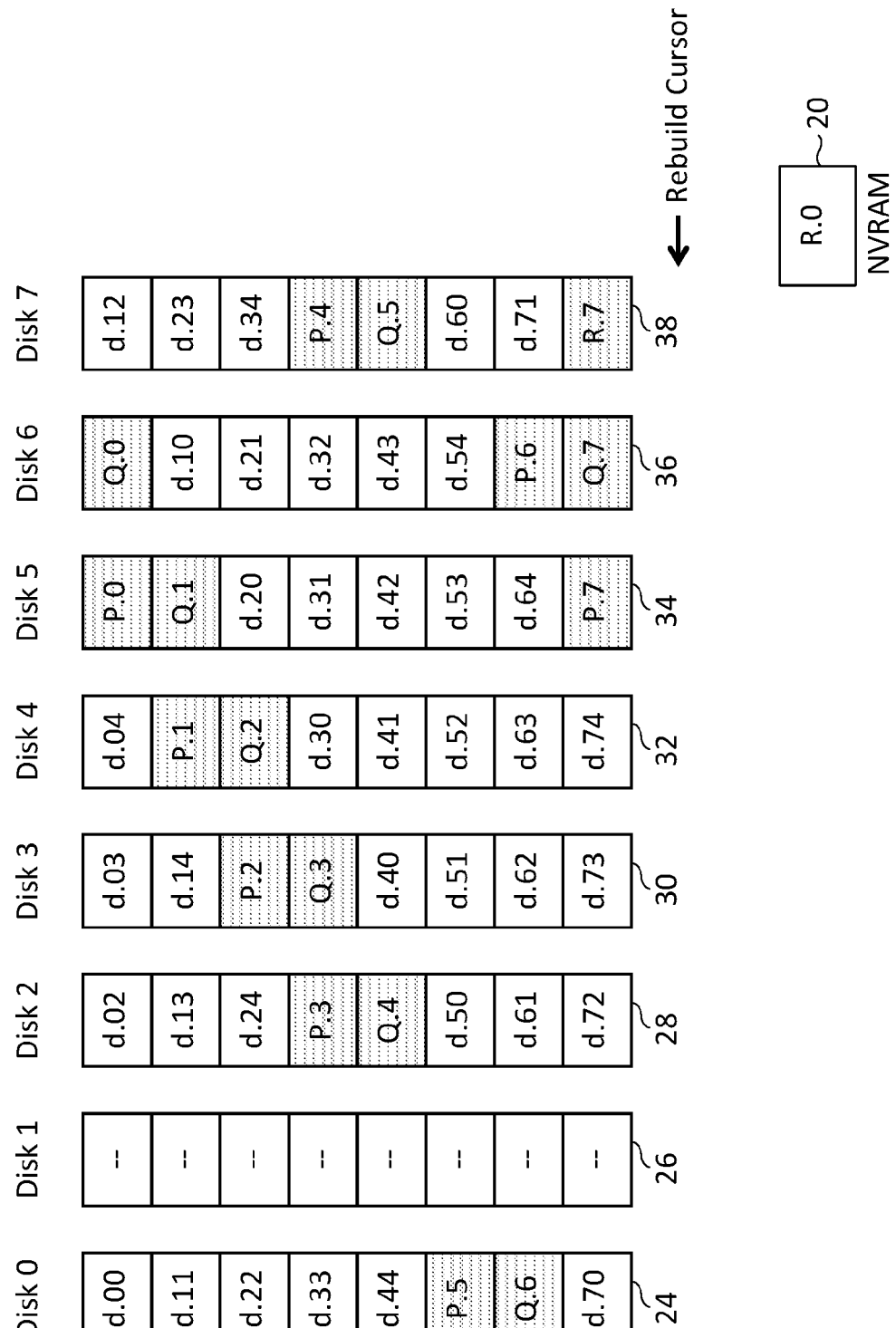
Figure 12:
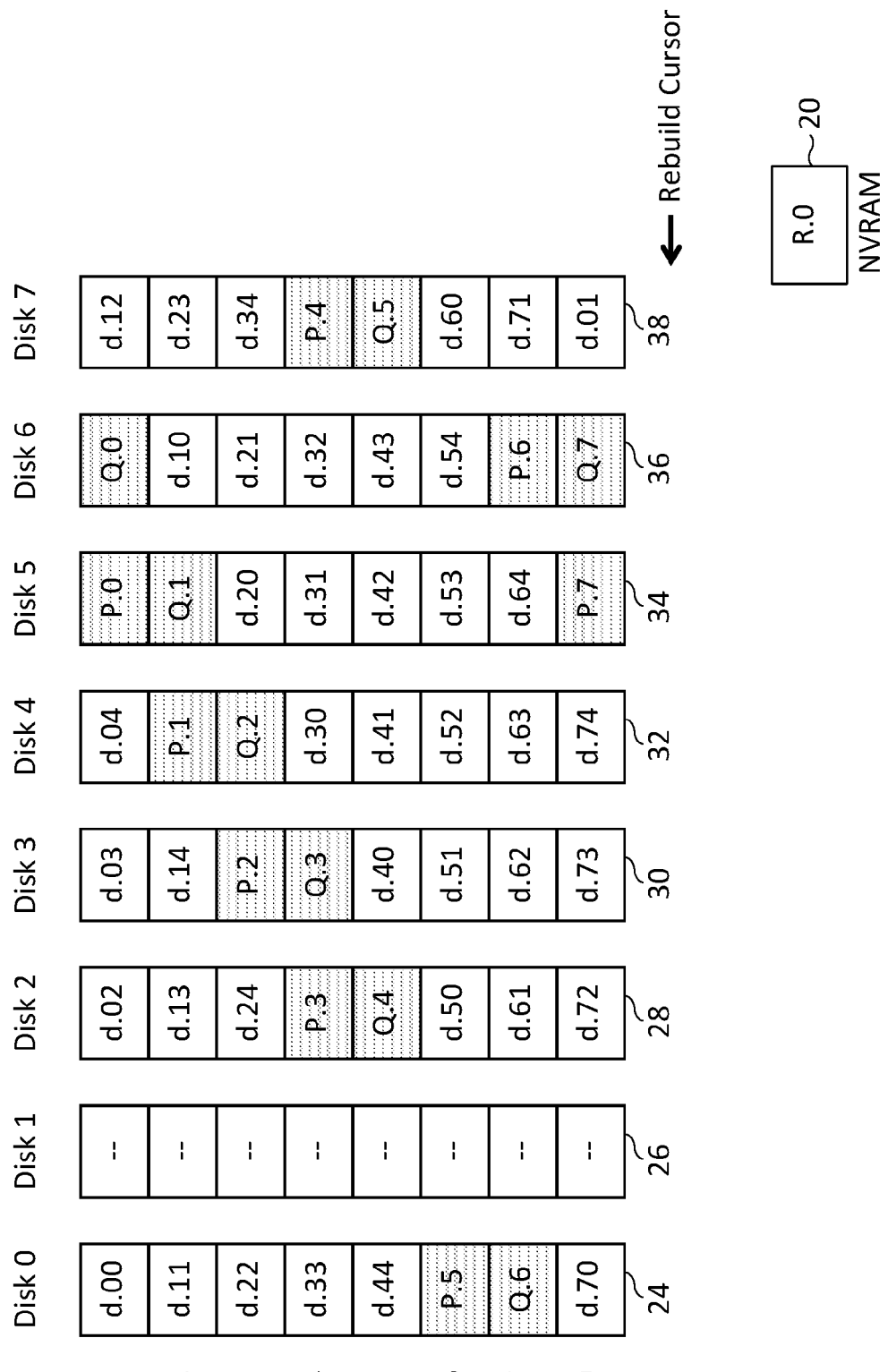

FIG. 11 depicts the state of the storage array after the processing of stripe 7. R.6 on disk 7 has been replaced with the reconstructed version of d.71, and the rebuild cursor has advanced to a terminal position. At this point, all the contents of disk 1 have been reconstructed onto disk 7, except for d.01. The final step of the rebuild process is to reconstruct d.01 and replace R.7 with the reconstructed version of d.01. Such state of the storage array is depicted in FIG. 12. After the contents of disk 1 have been reconstructed on disk 7, the storage array no longer operates in a degraded mode of operation (or more precisely, no longer has a chance of operating in a degraded mode of operation), but it still operates with dual-parity, not triple-parity.

Figure 13:
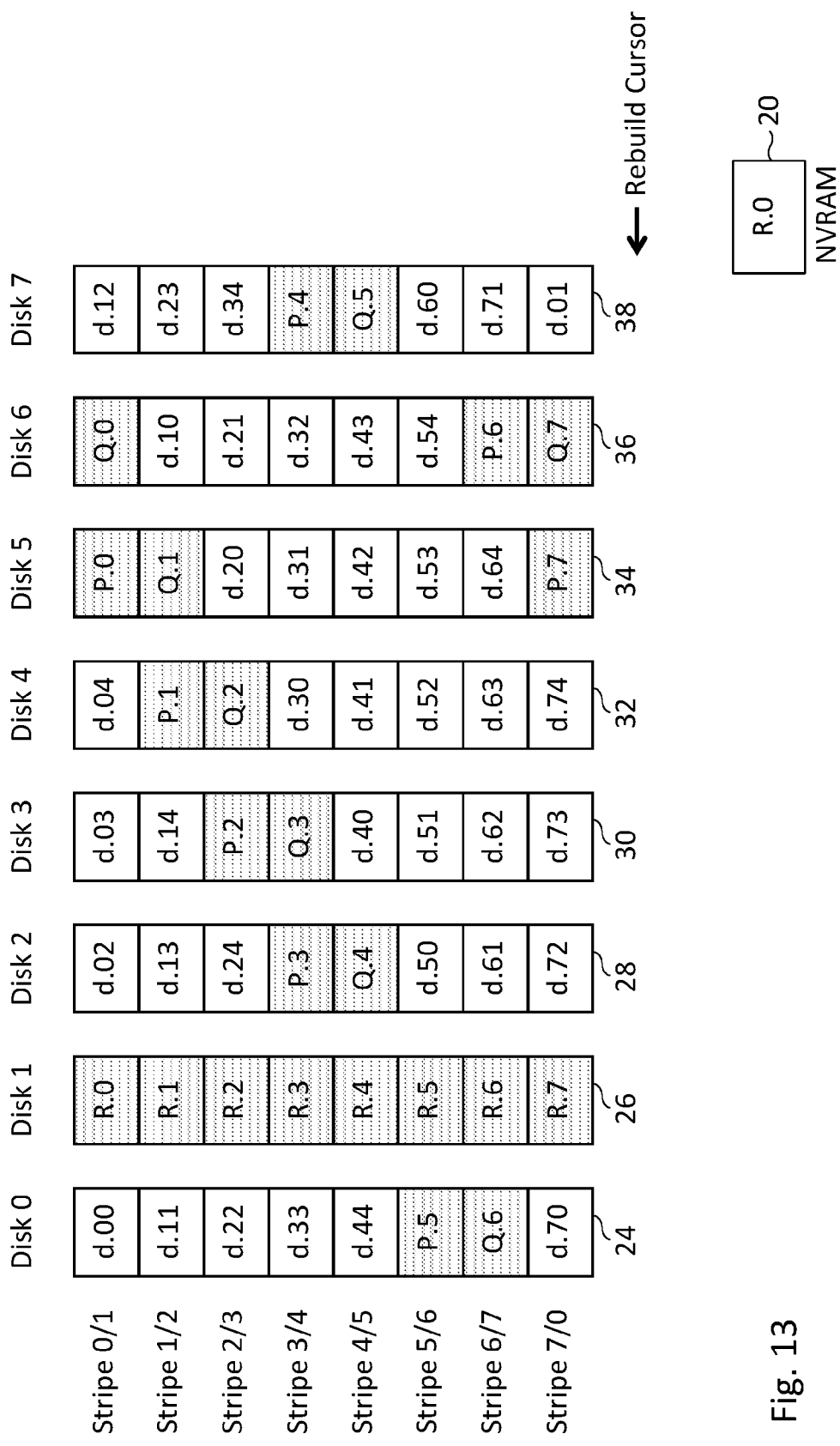
FIG. 13 depicts a storage array in which a failed disk has been substituted with a disk that is dedicated for storing error-correction blocks, in accordance with one embodiment.

FIG. 13 depicts the state of the storage array after the failed disk (i.e., disk 1 in the current example) has been replaced. The former contents of disk 7 are reconstructed on disk 1. No "offset-rebuild" is needed for the reconstruction of disk 7, as the reconstruction of disk 7 does not involve writing over any information (i.e., disk 1 has been replaced with a new and/or reformatted disk that is void of content). In effect, the contents of disk 1 and disk 7 have been interchanged after the two rebuild operations (i.e., rebuild of disk 1, followed by the rebuild of disk 7). Following the reconstruction of disk 7, the triple-parity of the storage array is restored.

It is noted that the presence of exactly 8 stripes is exemplary in nature. In general, a storage array could contain a larger or smaller number of stripes, while in practice, a storage array would typically store much more than 8 stripes.

Figure 14:
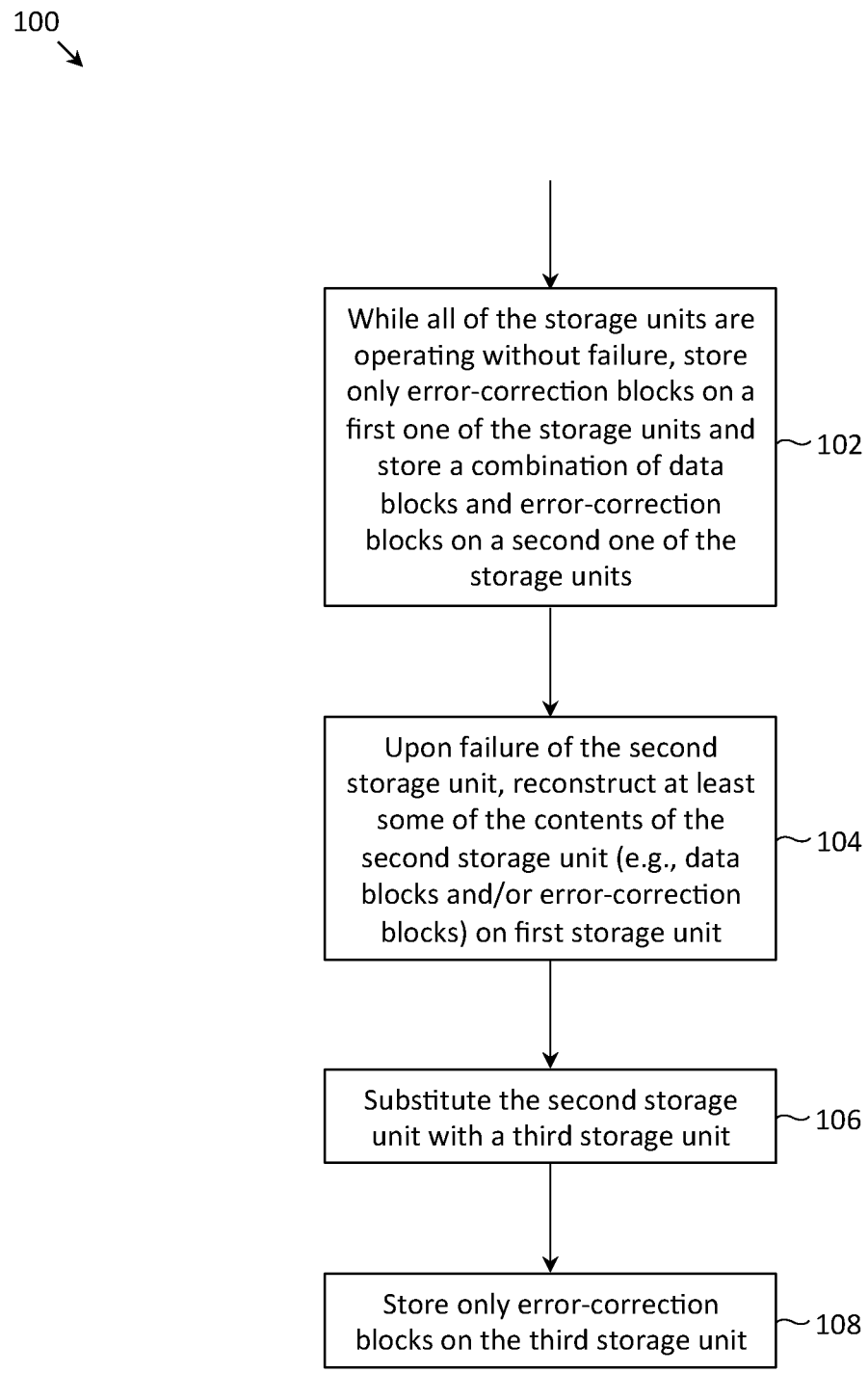
FIG. 14 depicts a flow diagram of a process for operating a storage array before and after the failure of one of the storage units of the array, in accordance with one embodiment.

FIG. 14 depicts process 100 for operating storage array 40 before and after the failure of one of the storage units of storage array 40, in accordance with one embodiment. While all of the storage units are operating without failure, storage controller 14 may store only error-correction blocks on a first one of the storage units (i.e., disk 7 in the above example) and store a combination of data blocks and error-correction blocks on a second one of the storage units (step 102). Upon failure of the second storage unit (i.e., disk 1 in the above example), storage controller 14 may reconstruct at least some of the contents of the second storage unit (e.g., data blocks and/or error-correction blocks) on the first storage unit (step 104). At step 106, the second storage unit (which has failed) may be substituted with a third storage unit (which is operational). Storage controller 14 may then store only error-correction blocks on the third storage unit (step 108).

Figure 15:
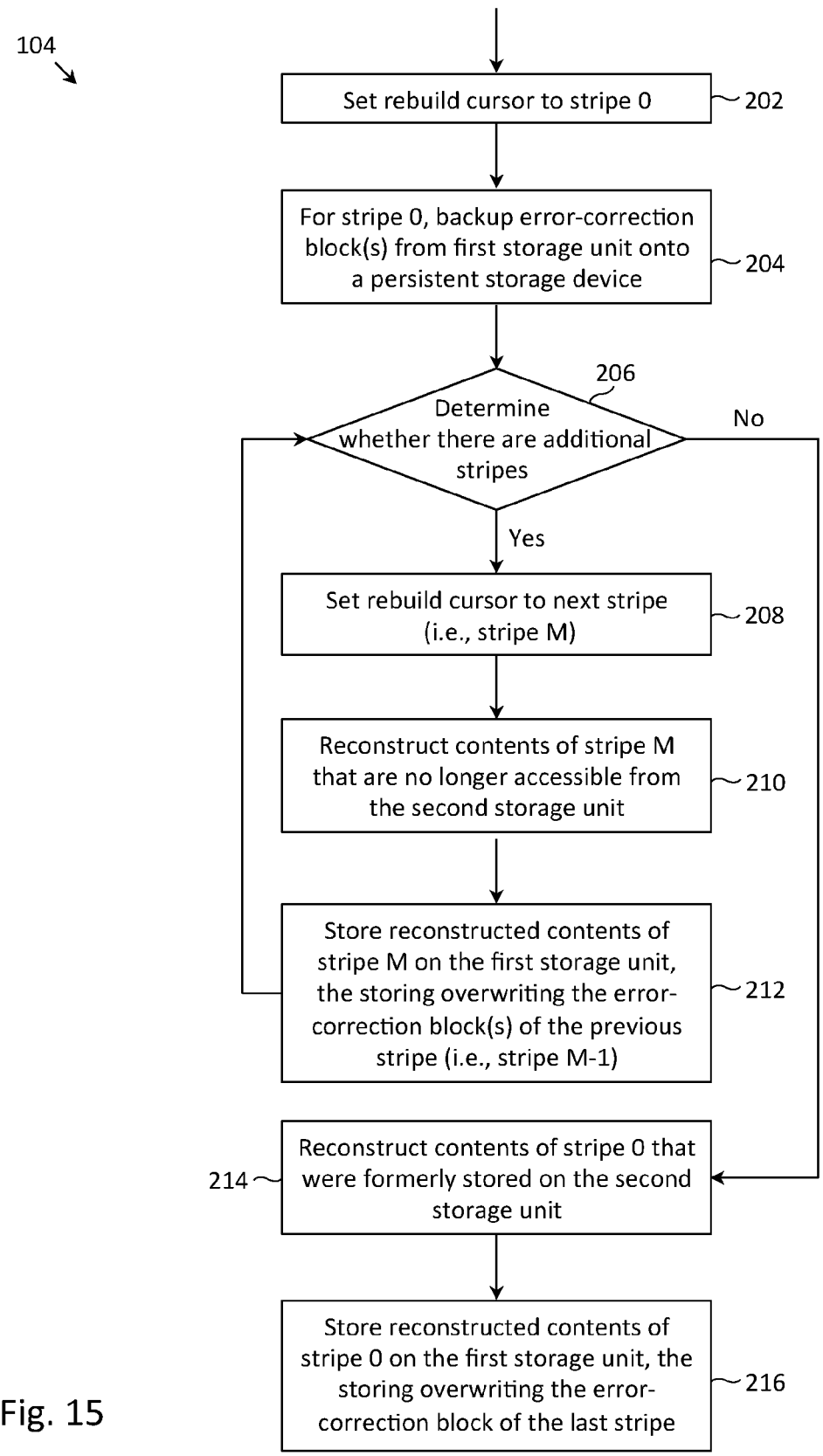
FIG. 15 depicts a flow diagram of a process for reconstructing contents of a failed storage unit onto a storage unit formerly dedicated for storing error-correction blocks, in accordance with one embodiment.

One embodiment of step 104, during which content of the second storage unit (i.e., failed storage unit) is reconstructed, is described in more detail in FIG. 15. At step 202, a rebuild cursor may be set to stripe 0. At step 204, error-correction block(s) of stripe 0 on the first storage unit may be saved onto a persistent storage device (e.g., NVRAM 20). At step 206, storage controller 14 may determine whether there are additional stripes that need to be processed. If so, at step 208, the rebuild cursor may be set to the next stripe (call the next stripe, stripe M, for ease of discussion). At step 210, the contents of stripe M (e.g., data block(s) or error-correction block(s)) that are no longer accessible from the second storage unit may be reconstructed. At step 212, the reconstructed contents may be stored on the first storage unit, the storing overwriting the error-correction block(s) of the previous stripe (i.e., stripe M−1). Process 104 may then proceed to step 206, which determines whether there are additional stripes that need to be processed. If so, another stripe is processed in a similar manner. If not, process 104 may proceed to step 214, in which contents of stripe 0 that were formerly stored on the second storage unit (data block d.01 in the example above) may be reconstructed. Finally, the reconstructed contents may be stored on the first storage unit, the storing overwriting the error-correction block(s) of the last stripe (error-correction block R.7 in the example above).

FIGS. 16A-16E depict a process for handling read and/or write requests during the reconstruction of the contents of the second storage unit (i.e., failed storage unit), in accordance with one embodiment. The process may begin by receiving an input/output (I/O) request and categorizing the I/O request, as described in process 300 of FIG. 16A. At step 302, storage controller 14 may receive an I/O request while the rebuild of the second storage unit (i.e., the failed storage unit) is in progress. At step 304, storage controller 14 may determine whether the I/O request is a read request or a write request. If the I/O request is a read request, process 300 may proceed to process 400 depicted in FIG. 16B. If the I/O request is a write request, storage controller 14 may determine whether the write request is a partial write request (i.e., a write request containing some but not all data blocks of a stripe) or a full write request (i.e., a write request containing all data blocks of a stripe). If the write request is a partial write request, process 300 may proceed to process 500 depicted in FIG. 16C. If the write request is a full write request, process 300 may proceed to process 800 depicted in FIG. 16F.

Figure 16A:
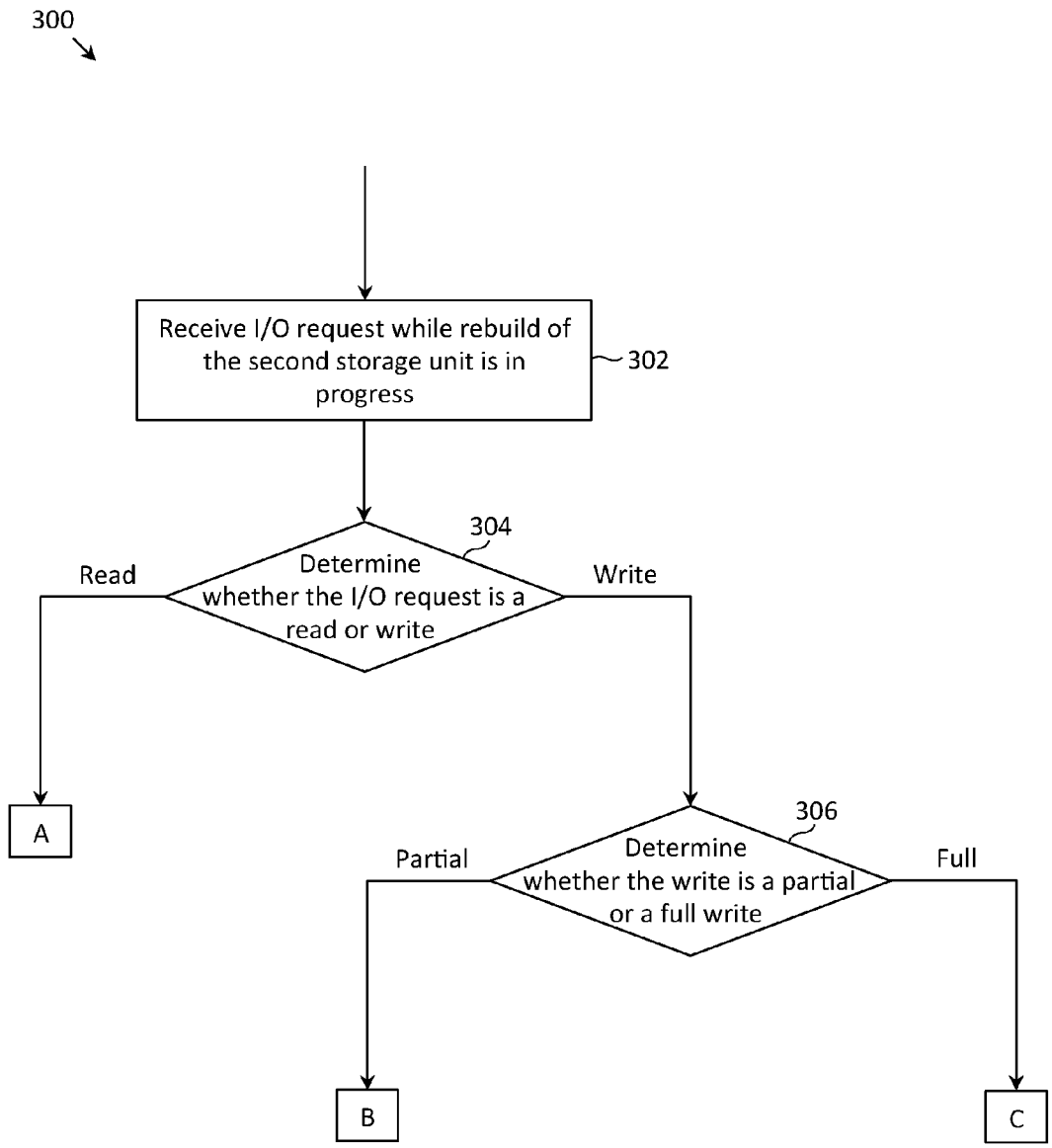
FIGS. 16A-16F depict flow diagrams of a process for handling read and/or write requests during the reconstruction of the contents of the failed storage unit, in accordance with one embodiment.
Figure 16B:
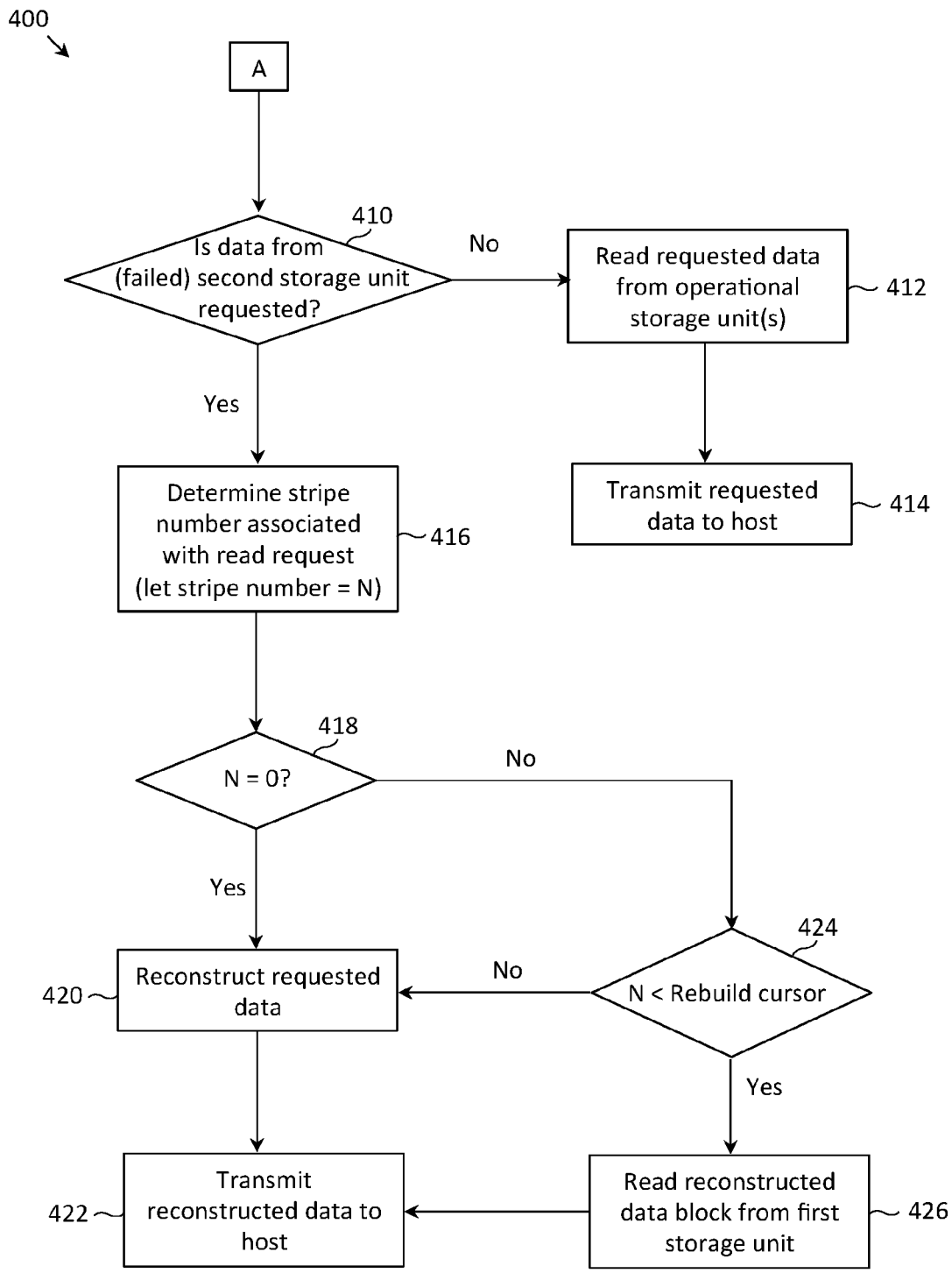

FIG. 16B depicts process 400 for handling a read request during the reconstruction of the contents of the second storage unit (i.e., failed storage unit), in accordance with one embodiment. At step 410, storage controller 14 may determine whether data from the second storage unit (i.e., the failed storage unit) is requested. If not, the requested data may be read from one or more of the operational storage units (step 412), and the requested data may be transmitted to host 22 (step 414).

If data from the second storage unit is requested, storage controller 14 may determine a stripe number associated with the data block(s) that are requested. Let the stripe number be "N", for ease of discussion. At step 418, storage controller 14 may determine whether the stripe number is 0. If so, the requested data may be reconstructed (step 420) (i.e., the requested data would be d.01 in the instance of disk 1 failing), and the reconstructed data may be transmitted to host 22 (step 422). In the case of reconstructing data block d.01, storage controller 14 may first read d.00, d.02, d.03, d.04 and P.0 and reconstruct d.01 based on these data and error-correction blocks of stripe 0.

If the stripe number is not 0, storage controller 14 may determine whether the stripe number is less than the rebuild cursor (step 424). If the stripe number is less than the rebuild cursor, this indicates that the requested data block(s) have already been reconstructed, and storage controller 14 can just read the requested data block(s) from the first storage unit (i.e., disk 7 in the example above) (step 426) and transmit the reconstructed data to host 22 (step 422). Storage controller 14 will, however, need to read the requested data block(s) from an "offset" location. For example, in the case of FIG. 9, instead of reading data block d.23 from stripe 2, storage controller 14 will read data block d.23 from stripe 1/2.

If the stripe number is not less than the rebuild cursor, this means that the requested data block(s) have not yet been reconstructed. The requested data block(s) may then be reconstructed (step 420), and the reconstructed data block(s) may then be transmitted to host 22 (step 422).

Figure 16C:
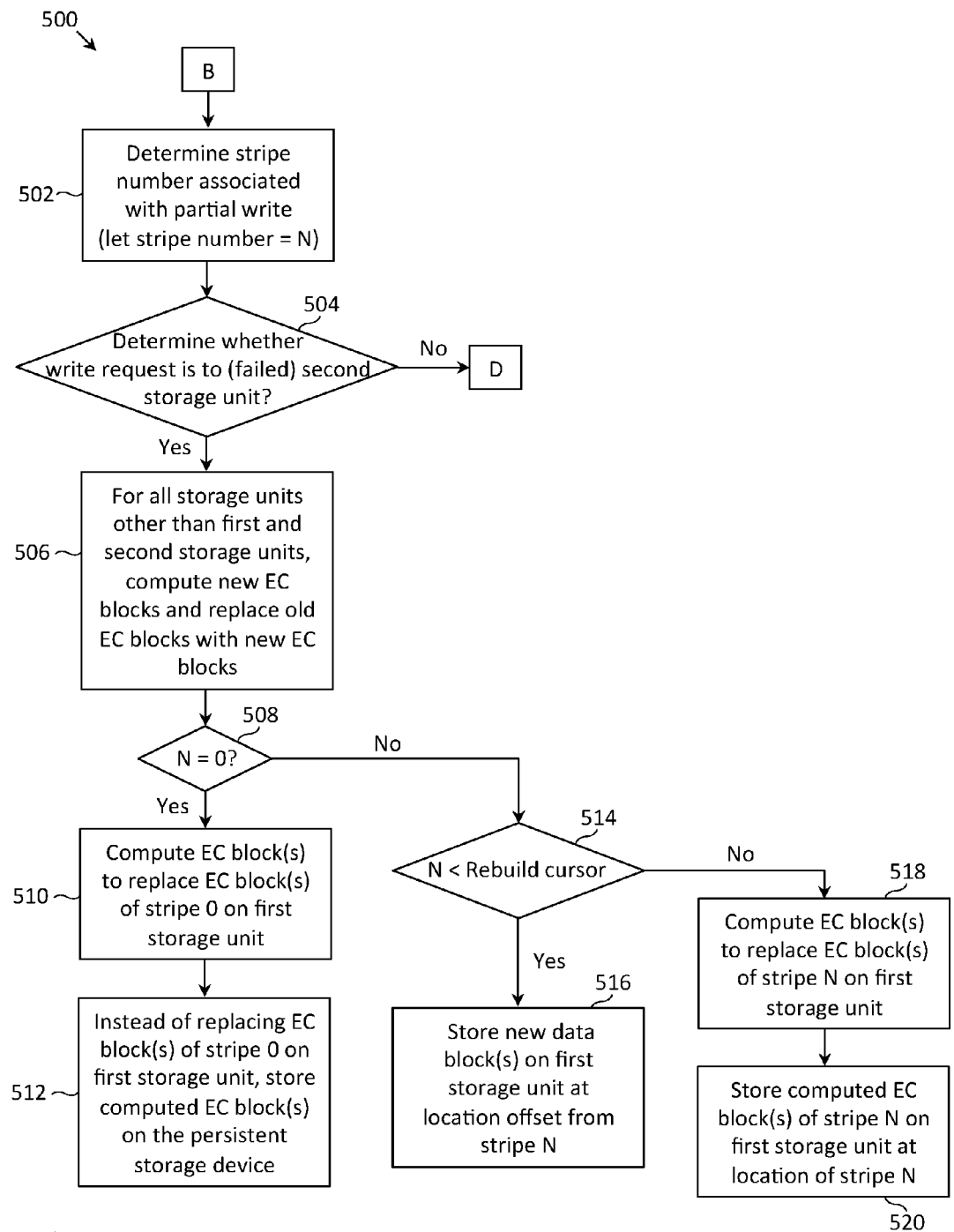
Figure 16D:
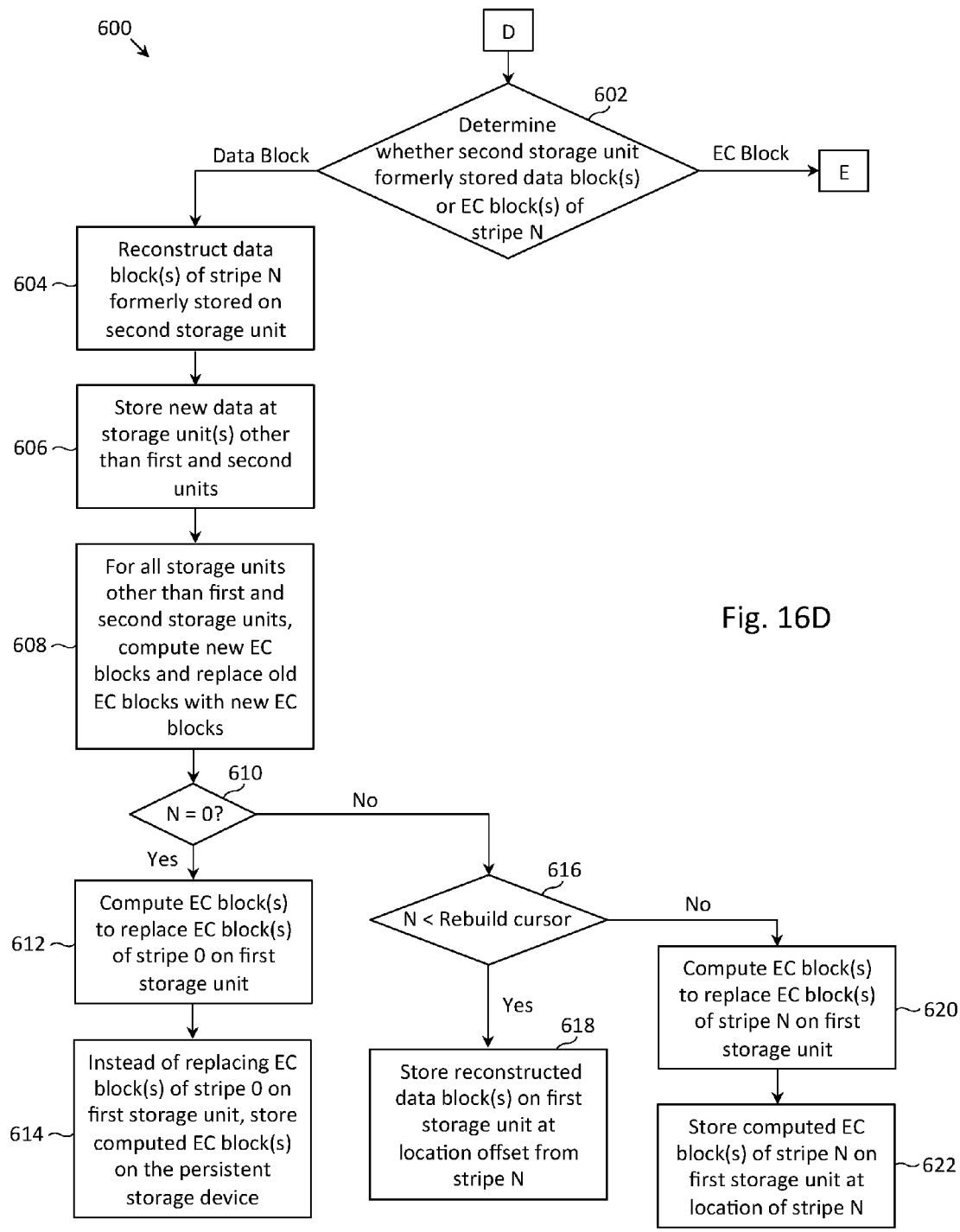
Figure 16E:
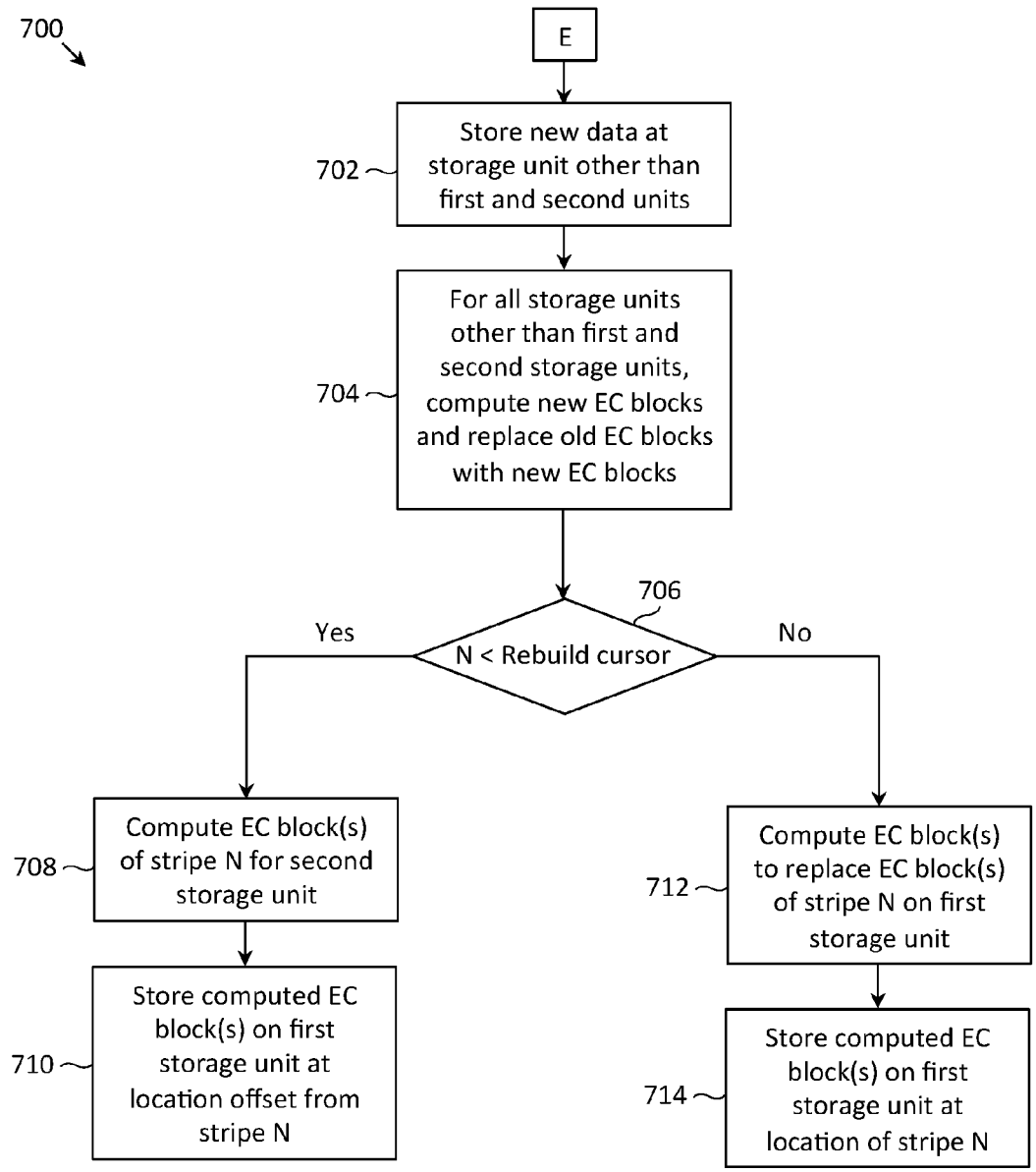

FIGS. 16C-16E depict processes 500, 600 and 700 for handling a partial write request during the reconstruction of the contents of the second storage unit (i.e., failed storage unit), in accordance with one embodiment. At step 502, storage controller 14 may determine a stripe number associated with the partial write request. For ease of discussion, let the stripe number be "N". At step 504, storage controller 14 may determine whether the partial write request is to the second storage unit. If not, process 500 may proceed to process 600 depicted in FIG. 16D. If the partial write request is to the second storage unit, storage controller 14 may compute, for all storage units other than the first and second storage units, new error-correction blocks for stripe N and replace the existing error-correction blocks of stripe N with the new error-correction blocks (step 506). For instance, if the write request is to data block d.01 of stripe 0, the data blocks of stripe 0 may be read (i.e., d.00, d.02, d.03 and d.04), and new error-correction blocks P.0' and Q.0' may be computed based on the data blocks (i.e., d.00, d.02, d.03 and d.04) and the data block from the write request (i.e., d.01').

At step 508, storage controller 14 may determine whether the stripe number is 0. If so, storage controller 14 may compute error-correction block(s) to replace the error-correction block(s) of stripe 0 on the first storage unit. For instance, R.0' may be computed based on the data blocks (i.e., d.00, d.02, d.03 and d.04) and the data block from the write request (i.e., d.01'). At step 512, instead of actually replacing the error-correction block(s) of stripe 0 on the first storage unit (i.e., R.0), storage controller 14 may store the computed error-correction block(s) (i.e., R.0') on the persistent storage device (e.g., on NVRAM 20).

If the stripe number is not 0, storage controller 14 may determine whether the stripe number is less than the rebuild cursor (step 514). If so, storage controller 14 may store the data from the write request on the first storage unit at a location offset from stripe N (step 516) (e.g., at a location on a stripe other than stripe N). For instance, if the write request is to modify d.12 of stripe 1, data block d.12' may be stored at the location where R.0 was formerly stored on the first storage unit. If the stripe number is not less than the rebuild cursor, storage controller 14 may compute error-correction block(s) to replace the error-correction block(s) of stripe N on the first storage unit (step 518). In the case of a write request to d.12, R.1' may be computed based on the data blocks (i.e., d.10, d.11, d.13 and d.14) and the data block from the write request (i.e., d.12'). At step 520, the computed error-correction block(s) of stripe N may be stored on the first storage unit at the location of stripe N. Continuing with the immediately preceding example, R.1 may be replaced with R.1'.

FIG. 16D depicts process 600 for handling a partial write request to an operational storage unit, in accordance with one embodiment. At step 602, storage controller 14 may determine whether the second storage unit (i.e., failed storage unit) formerly stored data block(s) or error-correction block(s) of stripe N. If data block(s) were formerly stored, process 600 may proceed to step 604; otherwise, if error-correction block(s) were formerly stored, process 600 may proceed to process 700 depicted in FIG. 16E. At step 604, storage controller 14 may reconstruct data block(s) of stripe N formerly stored on the second storage unit. For instance, if data block d.13 is to be modified, data block d.12 may be first reconstructed based on d.10, d.11, d.13, d.14 and P.1. Then, the new data block(s) associated with the partial write request may be stored on the storage units(s) other than the first and second storage units (step 606). Continuing with the immediately preceding example, d.13 would be modified (or replaced with d.13' of the partial write request). Storage controller 14 may then, for all storage units other than the first and second storage units, compute new error-correction block(s) for stripe N and replace the existing error-correction blocks of stripe N with the new error-correction blocks (step 608). Continuing with the immediately preceding example, P.1' and Q.1' could be computed based on d.10, d.11, d.12 (i.e., reconstructed version thereof), d.13' (i.e., data block incorporating changes from the write request), and d.14.

At step 610, storage controller 14 may determine whether the stripe number is 0. If so, storage controller 14 may compute error-correction block(s) to replace the error-correction block(s) of stripe 0 on the first storage unit (step 612). In the case of a write request to d.02, R.0' may be computed based on d.00, d.01 (i.e., reconstructed version thereof), d.02' (i.e., data block incorporating changes from the write request), d.03 and d.04. At step 614, instead of actually replacing the error-correction block(s) of stripe 0 on the first storage unit (i.e., R.0), storage controller 14 may store the computed error-correction block(s) (i.e., R.0') on the persistent storage device (e.g., on NVRAM 20).

If the stripe number is not 0, storage controller 14 may determine whether the stripe number is less than the rebuild cursor (step 616). If so, storage controller 14 may store the reconstructed data block(s) on the first storage unit at a location offset from stripe N (step 618). For instance, if the write request is to modify d.13 of stripe 1, the reconstructed version of d.12 may be stored at the location where R.0 was formerly stored on the first storage unit. If the stripe number is not less than the rebuild cursor, storage controller 14 may compute error-correction block(s) to replace the error-correction block(s) of stripe N on the first storage unit (step 620). For instance, if the write request is to modify d.13 of stripe 1, R.1' may be computed based on d.10, d.11, d.12 (i.e., reconstructed version thereof), d.13' (i.e., data block incorporating changes from the write request) and d.14. At step 622, the computed error-correction block(s) of stripe N may be stored on the first storage unit at the location of stripe N. Continuing with the immediately preceding example, R.1 may be replaced with R.1'.

FIG. 16E depicts process 700 for handling a partial write request to a storage unit other than the failed storage unit in the instance when error-correction block(s) of stripe N were formerly stored on the second storage unit, in accordance with one embodiment. At step 702, the new data block(s) associated with the partial write request may be stored on the storage units(s) other than the first and second storage units (step 702). For instance, d.40 of stripe 4 could be modified (or replaced with d.40' of the write request). Storage controller 14 may then, for all storage units other than the first and second storage units, compute new error-correction blocks for stripe N and replace the existing error-correction blocks of stripe N with the new error-correction blocks (step 704). Continuing with the immediately preceding example, Q.4' could be computed based on d.40' (i.e., data block incorporating changes from the write request), d.41, d.42, d.43 and d.44.

Storage controller 14 may then determine whether the stripe number is less than the rebuild cursor (step 706). If so, storage controller 14 may compute error-correction block(s) of stripe N for the second storage unit (step 708) (i.e., compute error-correction block(s) of stripe N that would have been stored on the second storage unit if the second storage unit were still operational). Continuing with the immediately preceding example, P.4' may be computed based on d.40' (i.e., data block incorporating changes from the write request), d.41, d.42, d.43 and d.44. The computed error-correction block(s) may then be stored on the first storage unit at a location offset from stripe N (step 710). Continuing with the immediately preceding example, P.4' may be stored at the location where error-correction block R.3 was formerly stored. If the stripe number is not less than the rebuild cursor, storage controller 14 may compute error-correction block(s) to replace the error-correction block(s) of stripe N on the first storage unit (step 712). Continuing with the above example where d.40 is being modified, R.4' may be computed based on d.40' (i.e., data block incorporating changes from the write request), d.41, d.42, d.43 and d.44. At step 714, the computed error-correction block(s) of stripe N may be stored on the first storage unit at the location of stripe N. Continuing with the immediately preceding example, R.4 may be replaced with R.4'.

Figure 16F:
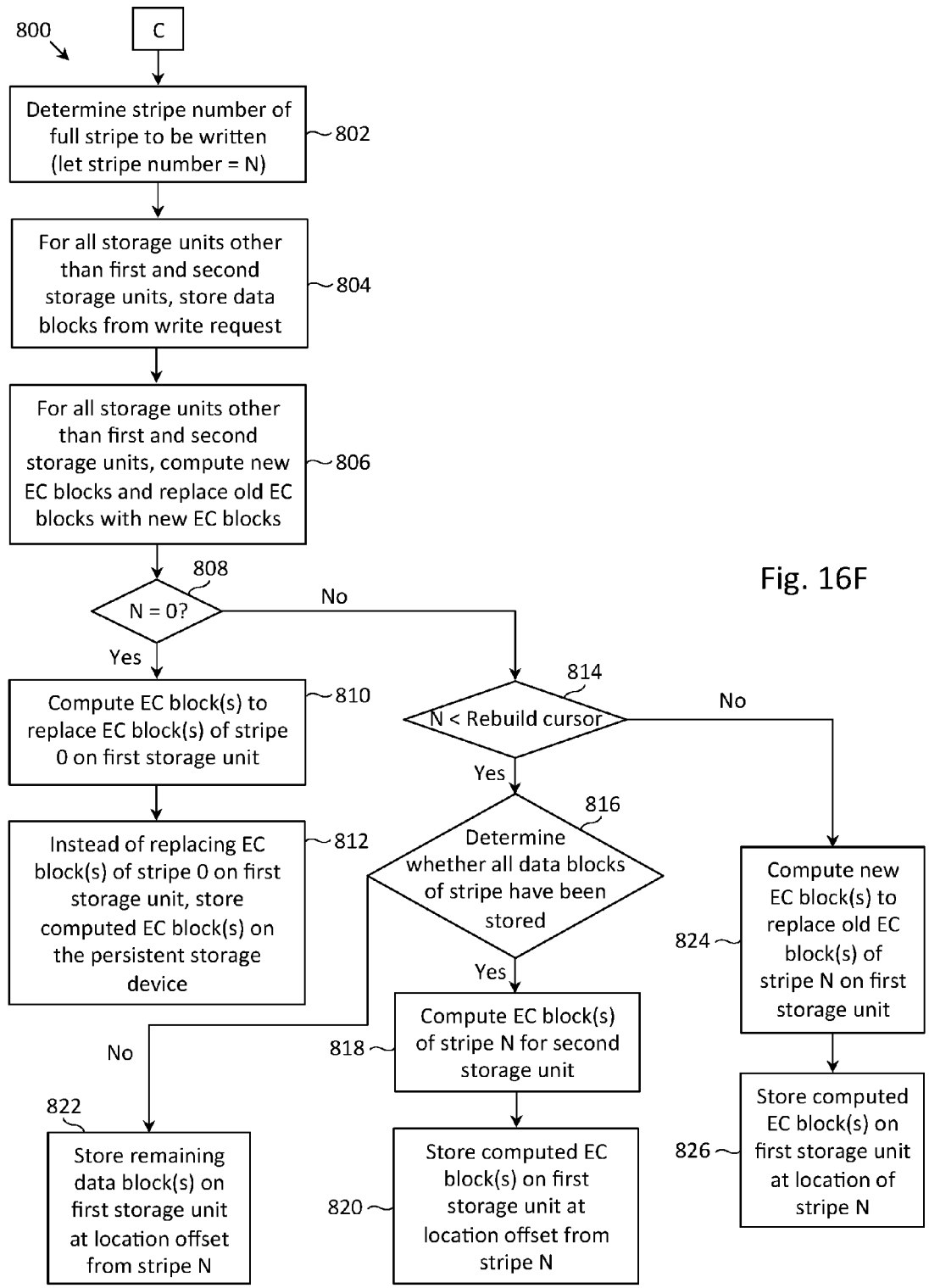

FIG. 16F depicts process 800 for handling a full write request during the reconstruction of the contents of the second storage unit (i.e., failed storage unit), in accordance with one embodiment. At step 802, storage controller 14 may determine a stripe number associated with the full write request. For ease of discussion, let the stripe number be N. For all storage units other than the first and second storage units, storage controller 14 may store the data blocks from the write request (step 804). For all storage units other than the first and second storage units, storage controller 14 may compute new error-correction blocks for stripe N and replace the existing error-correction blocks of stripe N with the new error-correction blocks (step 806). For instance, if the full write request is to stripe 1, new error-correction blocks P.1' and Q.1' may be computed based on the data blocks from the full stripe (i.e., d.10', d.11', d.12', d.13' and d.14').

At step 808, storage controller 14 may determine whether the stripe number is 0. If so, storage controller 14 may compute error-correction block(s) to replace the error-correction block(s) of stripe 0 on the first storage unit. For instance, R.0' may be computed based on the data blocks from the full stripe (i.e., d.00', d.01', d.02' d.03' and d.04'). At step 812, instead of actually replacing the error-correction block(s) of stripe 0 on the first storage unit (i.e., R.0), storage controller 14 may store the computed error-correction block(s) (i.e., R.0') on the persistent storage device (e.g., NVRAM 20).

If the stripe number is not 0, storage controller 14 may then determine whether the stripe number is less than the rebuild cursor (step 814). If so, storage controller 14 may determine whether all data blocks of the full stripe have been stored (step 816). If so, storage controller 14 may compute error-correction block(s) of stripe N for the second storage unit (i.e., compute error-correction block(s) of stripe N that would have been stored on the second storage unit if the second storage unit were still operational) (step 818). For instance, in the case of a full stripe write to stripe 4, P.4' may be computed based on d.40', d.41', d.42', d.43' and d.44'. The computed error-correction block(s) may then be stored on the first storage unit at a location offset from stripe N (step 820). Continuing with the immediately preceding example, P.4' may be stored at the location where error-correction block R.3 was formerly stored. If storage controller 14 determines that not all data blocks of the full stripe have been stored, storage controller 14 may store the remaining data block(s) (i.e., data block(s) from write request that have yet to be stored) on the first storage unit at a location offset from stripe N (step 822). For instance, in the case of a full stripe write to stripe 1, d.12' may be stored on the first storage unit at the location where R.0 was formerly stored.

If the stripe number is not less than the rebuild cursor, storage controller 14 may compute new error-correction block(s) to replace the existing error-correction block(s) of stripe N on the first storage unit (step 824). For instance, in the case of a full stripe write to stripe 4, R.4' may be computed based on d.40', d.41', d.42', d.43' and d.44'. At step 826, the computed error-correction block(s) of stripe N may be stored on the first storage unit at the location of stripe N. Continuing with the immediately preceding example, R.4 may be replaced with R.4'.

While the embodiment of FIG. 4 employs two rotated parity blocks and only one storage unit dedicated for storing error-correction blocks, techniques of the present invention may also be employed in a scheme with two storage units dedicated for storing error-correction blocks and one rotated parity block. For instance, disk 6 and disk 7 could be designated for storing error-correction blocks, while an error-correction block of each stripe could be stored on disk 0 through disk 5 in a distributed manner. In such a scheme, two failed storage units may be rebuilt, one on each of the storage units dedicated for storing error-correction blocks.

While the embodiment of FIG. 4 employs triple-parity, techniques of the present invention may also be employed in a scheme with dual-parity. For instance, disk 7 could be designated for storing error-correction blocks, while an error-correction block of each stripe could be stored on disk 0 through disk 6 in a distributed manner.

While the embodiments discussed so far process one stripe at a time, this was for ease of discussion. In a preferred embodiment of the invention, groups of contiguous stripes may be processed together. For instance, one may first reconstruct the blocks for stripes 0-3 that have been lost on a failed disk. The reconstructed blocks for stripes 0-3 may then be stored on the persistent storage device (e.g., NVRAM). Then, one may reconstruct the blocks for stripes 4-7 that have been lost on the failed disk. The reconstructed blocks for stripes 4-7 may then be stored on the first storage unit at the locations of R.0-R.3. Then, one may reconstruct the blocks for stripes 8-11 that have been lost on the failed disk. The reconstructed blocks for stripes 8-11 may then be stored on the first storage unit at the locations of R.4-R.7. Such process may be repeated for higher numbered stripes in a similar manner.

While the embodiments discussed so far rely upon a rebuild cursor for distinguishing stripe(s) that have been reconstructed from stripe(s) that have yet to be reconstructed (or are currently undergoing reconstruction), other embodiments of the invention need not rely upon a rebuild cursor. For instance, a status map could be employed to record the stripes that have been reconstructed and the stripes that have yet to be reconstructed (e.g., by means of a status bit associated with each stripe).

While the embodiments discussed so far employ a single rebuild cursor, this is not necessarily so. In other embodiments, multiple rebuild cursors could be simultaneously employed. For instance, a first rebuild cursor could be used to iterate through stripes 0-99, a second rebuild cursor could be used to iterate through stripes 100-199, and so on. An advantage of employing multiple rebuild cursors is the ability to rebuild several stripes at a time, which decreases the overall time it takes to rebuild the contents of a failed storage unit. In another embodiment, the rebuild process could begin with a single rebuild cursor. However, upon a read and/or write request being associated with a stripe greater than the existing rebuild cursor(s), an additional rebuild cursor could be created to mark the position of the stripe associated with the read and/or write request. Stripes could be successively rebuilt starting at the position of each additional rebuild cursor.

Figure 17:
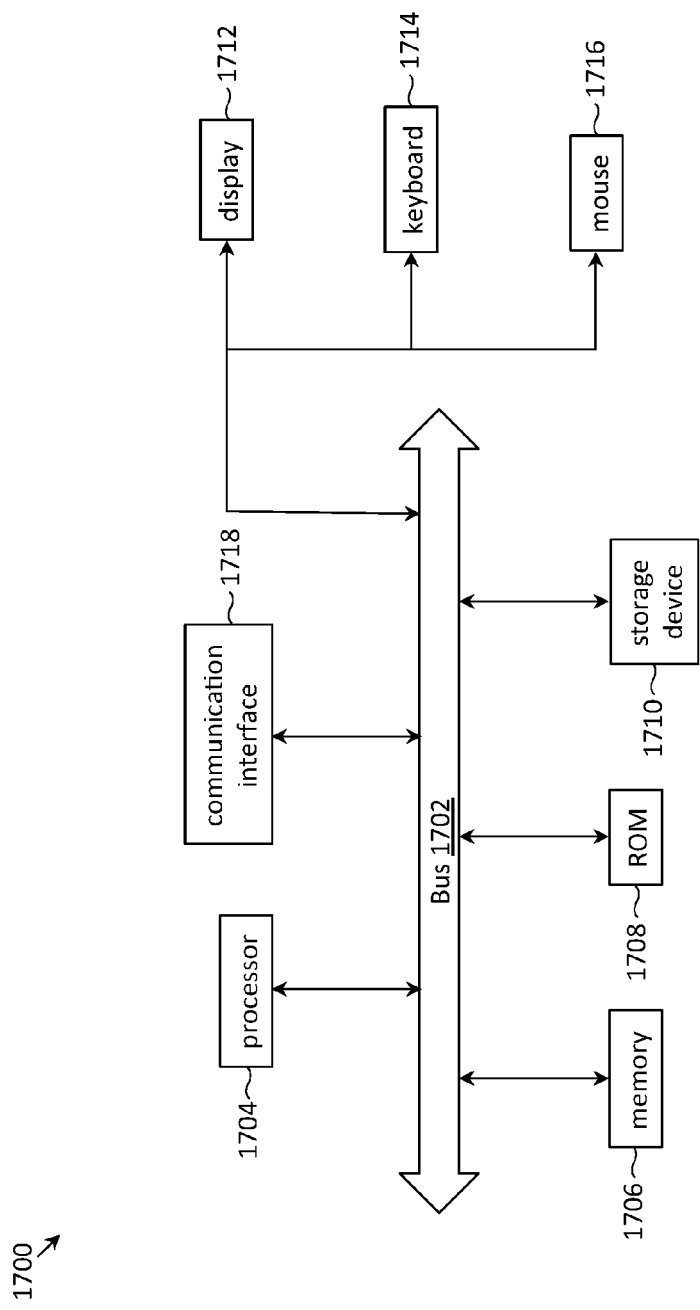
FIG. 17 depicts components of a computer system in which computer readable instructions instantiating the methods of the present invention may be stored and executed.

As is apparent from the foregoing discussion, aspects of the present invention involve the use of various computer systems and computer readable storage media having computer-readable instructions stored thereon. FIG. 17 provides an example of a system 1700 that is representative of any of the computing systems discussed herein. Further, computer system 1700 may be representative of a system that performs any of the processes depicted in FIGS. 14-16. Note, not all of the various computer systems have all of the features of system 1700. For example, certain ones of the computer systems discussed above may not include a display inasmuch as the display function may be provided by a client computer communicatively coupled to the computer system or a display function may be unnecessary. Such details are not critical to the present invention.

System 1700 includes a bus 1702 or other communication mechanism for communicating information, and a processor 1704 coupled with the bus 1702 for processing information. Computer system 1700 also includes a main memory 1706, such as a random access memory (RAM) or other dynamic storage device, coupled to the bus 1702 for storing information and instructions to be executed by processor 1704. Main memory 1706 also may be used for storing temporary variables or other intermediate information during execution of instructions to be executed by processor 1704. Computer system 1700 further includes a read only memory (ROM) 1708 or other static storage device coupled to the bus 1702 for storing static information and instructions for the processor 1704. A storage device 1710, which may be one or more of a floppy disk, a flexible disk, a hard disk, flash memory-based storage medium, magnetic tape or other magnetic storage medium, a compact disk (CD)-ROM, a digital versatile disk (DVD)-ROM, or other optical storage medium, or any other storage medium from which processor 1704 can read, is provided and coupled to the bus 1702 for storing information and instructions (e.g., operating systems, applications programs and the like).

Computer system 1700 may be coupled via the bus 1702 to a display 1712, such as a flat panel display, for displaying information to a computer user. An input device 1714, such as a keyboard including alphanumeric and other keys, may be coupled to the bus 1702 for communicating information and command selections to the processor 1704. Another type of user input device is cursor control device 1716, such as a mouse, a trackball, or cursor direction keys for communicating direction information and command selections to processor 1704 and for controlling cursor movement on the display 1712. Other user interface devices, such as microphones, speakers, etc. are not shown in detail but may be involved with the receipt of user input and/or presentation of output.

The processes referred to herein may be implemented by processor 1704 executing appropriate sequences of computer-readable instructions contained in main memory 1706. Such instructions may be read into main memory 1706 from another computer-readable medium, such as storage device 1710, and execution of the sequences of instructions contained in the main memory 1706 causes the processor 1704 to perform the associated actions. In alternative embodiments, hard-wired circuitry or firmware-controlled processing units (e.g., field programmable gate arrays) may be used in place of or in combination with processor 1704 and its associated computer software instructions to implement the invention. The computer-readable instructions may be rendered in any computer language including, without limitation, C#, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ and the like. In general, all of the aforementioned terms are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 1700 or similar electronic computing device, that manipulates and transforms data represented as physical (electronic) quantities within its registers and memories into other data similarly represented as physical quantities within its memories or registers or other such information storage, transmission or display devices.

Computer system 1700 also includes a communication interface 1718 coupled to the bus 1702. Communication interface 1718 may provide a two-way data communication channel with a computer network, which provides connectivity to and among the various computer systems discussed above. For example, communication interface 1718 may be a local area network (LAN) card to provide a data communication connection to a compatible LAN, which itself is communicatively coupled to the Internet through one or more Internet service provider networks. The precise details of such communication paths are not critical to the present invention. What is important is that computer system 1700 can send and receive messages and data through the communication interface 1718 and in that way communicate with hosts accessible via the Internet.

Thus, methods and systems for storing data in a redundant manner on a plurality of storage units of a storage system have been described. It is to be understood that the above-description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method for a computing system having a plurality of storage units, the method comprising:

storing, by a controller of the computing system, a first and a second data stripe in the plurality of storage units; and subsequent to a failure of one of the storage units that stored a first block of the second data stripe, (i) reconstructing, by the controller, the first block of the second data stripe so as to form a reconstructed version of the first block of the second data stripe, and (ii) replacing, by the controller, a first block of the first data stripe stored in a non-failed storage unit of the storage units with the reconstructed version of the first block of the second data stripe.

2. The method of claim 1, wherein the first block of the second data stripe is a data block, and wherein the storing the first and second data stripes in the plurality of storage units comprises storing at least one block of each of the first and second stripes on each of the plurality of storage units.

3. The method of claim 1, wherein the first block of the second data stripe is an error-correction block.

4. The method of claim 1, wherein the first block of the first data stripe is an error-correction block.

5. The method of claim 1, further comprising:

storing, by the controller of the computing system, a third data stripe in the plurality of storage units, wherein the failed storage unit stored a first block of the third data stripe; and subsequent to replacing the first block of the first data stripe in the non-failed storage unit with the reconstructed version of the first block of the second data stripe, (i) reconstructing, by the controller, the first block of the third data stripe stored in the failed storage unit so as to form a reconstructed version of the first block of the third data stripe, and (ii) replacing, by the controller, a second block of the second data stripe in the non-failed storage unit with the reconstructed version of the first block of the third data stripe.

6. The method of claim 1, further comprising, prior to replacing the first block of the first data stripe in the non-failed storage unit with the reconstructed version of the first block of the second data stripe, storing a copy of the first block of the first data stripe from the non-failed storage unit in a non-volatile random access memory (NVRAM) of the computing system.

7. The method of claim 1, further comprising, prior to replacing the first block of the first data stripe in the non-failed storage unit with the reconstructed version of the first block of the second data stripe, storing a copy of the first block of the first data stripe from the non-failed storage unit in another one of the storage units other than the failed storage unit.

8. The method of claim 1, wherein the failed storage unit stored a second block of the first stripe, and the method further comprises:
    prior to replacing the first block of the first data stripe in the non-failed storage unit with the reconstructed version of the first block of the second data stripe, reconstructing the second block of the first data stripe stored in the failed storage unit, and
    replacing a first block of a third stripe in the non-failed storage unit with the reconstructed version of the second block of the first data stripe.

9. A computing system, comprising:
    a plurality of storage units;
    a main memory;
    a processor communicatively coupled to the plurality of storage units and the main memory; and
    a set of instructions on the main memory that, when executed by the processor, cause the processor to:
        store a first and a second data stripe in the plurality of storage units; and
        subsequent to a failure of one of the storage units that stored a first block of the second stripe, (i) reconstruct the first block of the second data stripe so as to form a reconstructed version of the first block of the second data stripe, and (ii) replace a first block of the first data stripe stored in a non-failed storage unit of the storage units with the reconstructed version of the first block of the second data stripe.

10. The computing system of claim 9, wherein the first block of the second data stripe is a data block, and
    wherein to store the first and second data stripes in the plurality of storage units, the set of instructions is executable to cause the processor to store at least one block of each of the first and second stripes on each of the plurality of storage units.

11. The computing system of claim 9, wherein the first block of the second data stripe is an error-correction block.

12. The computing system of claim 9, wherein the set of instructions is executable to cause the processor to:
    store a third data stripe in the plurality of storage units, wherein the failed storage unit stored a first block of the third data stripe; and
    subsequent to replacing the first block of the first data stripe in the non-failed storage unit with the reconstructed version of the first block of the second data stripe, reconstruct the first block of the third data stripe stored in the failed storage unit to form a reconstructed version of the first block of the third data stripe, and replace a second block of the second data stripe in the non-failed storage unit with the reconstructed version of the first block of the third data stripe.

13. The computing system of claim 9, wherein the set of instructions is executable to cause the processor to:
    prior to replacing the first block of the first data stripe in the non-failed storage unit with the reconstructed version of the first block of the second data stripe, store a copy of the first block of the first data stripe from the non-failed storage unit in a non-volatile random access memory (NVRAM) of the computing system.

14. The computing system of claim 9, wherein the set of instructions is executable to cause the processor to:
    prior to replacing the first block of the first data stripe in the non-failed storage unit with the reconstructed version of the first block of the second data stripe, store a copy of the first block of the first data stripe from the non-failed storage unit in another one of the storage units other than the failed storage unit.

15. A non-transitory machine-readable storage medium for a computing system having a plurality of storage units, a main memory, and a processor communicatively coupled to the plurality of storage units and the main memory, the non-transitory machine-readable storage medium comprising software instructions that, when executed by the processor, cause the processor to:
    store a first and a second data stripe in the plurality of storage units; and
    subsequent to a failure of one of the storage units that stored a first block of the second data stripe, (i) reconstruct the first block of the second data stripe so as to form a reconstructed version of the first block of the second data stripe, and (ii) replace a first block of the first data stripe stored in a non-failed storage unit of the storage units with the reconstructed version of the first block of the second data stripe.

16. The non-transitory machine-readable storage medium of claim 15, wherein the first block of the second data stripe is a data block, and
    wherein to store the first and second data stripes in the plurality of storage units, the software instructions are executable to cause the processor to store at least one block of each of the first and second stripes on each of the plurality of storage units.

17. The non-transitory machine-readable storage medium of claim 15, wherein the first block of the second data stripe is an error-correction block.

18. The non-transitory machine-readable storage medium of claim 15, wherein the software instructions are executable to cause the processor to:
    store a third data stripe in the plurality of storage units, wherein a first block of the third stripe was stored in the failed storage unit; and
    subsequent to replacing the first block of the first data stripe in the non-failed storage unit with the reconstructed version of the first block of the second data stripe, reconstruct the first block of the third data stripe stored in the failed storage unit to form a reconstructed version of the first block of the third data stripe, and replace a second block of the second data stripe in the non-failed storage unit with the reconstructed version of the first block of the third data stripe.

19. The non-transitory machine-readable storage medium of claim 15, wherein the software instructions are executable to cause the processor to:
    prior to replacing the first block of the first data stripe in the non-failed storage unit with the reconstructed version of the first block of the second data stripe, store a copy of the first block of the first data stripe from the non-failed storage unit in a non-volatile random access memory (NVRAM) of the computing system.

20. The non-transitory machine-readable storage medium of claim 15, wherein the software instructions are executable to cause the processor to:

prior to replacing the first block of the first data stripe in the non-failed storage unit with the reconstructed version of the first block of the second data stripe, store a copy of the first block of the first data stripe from the non-failed storage unit in another one of the storage units other than the failed storage unit.

* * * * *